(12) United States Patent
Rehme

(10) Patent No.: US 7,380,811 B2
(45) Date of Patent: Jun. 3, 2008

(54) SHOCK ABSORBING TRAILER HITCH

(76) Inventor: Mark L. Rehme, 1449 County Rd. 1590, Rush Springs, OK (US) 73082

( * ) Notice: Subject to any disclaimer, the term of this patent is extended or adjusted under 35 U.S.C. 154(b) by 30 days.

(21) Appl. No.: 11/472,090

(22) Filed: Jun. 21, 2006

(65) Prior Publication Data

US 2007/0262561 A1    Nov. 15, 2007

Related U.S. Application Data

(63) Continuation of application No. 11/433,241, filed on May 12, 2006.

(51) Int. Cl.
*B60D 1/50*    (2006.01)
(52) U.S. Cl. .................... 280/483; 280/486; 280/490.1; 280/511; 280/489
(58) Field of Classification Search ................ 280/483, 280/486, 490.1, 511, 489
See application file for complete search history.

(56) References Cited

U.S. PATENT DOCUMENTS

| | | | |
|---|---|---|---|
| 3,892,398 A | 7/1975 | Marsh | |
| 3,904,228 A | 9/1975 | Smalley | |
| 4,077,650 A | 3/1978 | Leach, Jr. | |
| 4,460,194 A | 7/1984 | McGhie et al. | |
| 5,324,061 A | 6/1994 | Lay | |
| 5,380,030 A | 1/1995 | Gullickson | |
| 5,421,599 A | 6/1995 | Maines | |
| 5,683,094 A | 11/1997 | Gullickson | |
| 5,836,603 A | 11/1998 | Logan et al. | |
| 5,868,415 A | 2/1999 | Van Vleet | |
| 5,975,553 A | 11/1999 | Van Vleet | |
| 6,155,588 A * | 12/2000 | Maxey | 280/488 |
| 6,170,849 B1 * | 1/2001 | McCall | 280/433 |
| 6,789,815 B2 * | 9/2004 | Moss et al. | 280/416.1 |
| 6,854,757 B2 | 2/2005 | Rehme | |
| 6,974,148 B2 * | 12/2005 | Moss et al. | 280/511 |
| 7,044,493 B1 * | 5/2006 | Wilson | 280/489 |
| 7,093,845 B1 * | 8/2006 | Fast | 280/489 |
| 2003/0178811 A1 * | 9/2003 | Buckner | 280/483 |

OTHER PUBLICATIONS www.trailersaver.com: 17 pages; document is undated but inventor believes the document is prior art.

* cited by examiner

*Primary Examiner*—Lesley D. Morris
*Assistant Examiner*—Michael Stabley
(74) *Attorney, Agent, or Firm*—Sand & Sebolt

(57) ABSTRACT

Shock-absorbing trailer hitches each include a mounting member mountable on a towing vehicle; a hitch member which includes a coupler and which is mountable on a towed vehicle and pivotally mounted on the mounting member; and a shock absorbing mechanism for reacting pivotal movement of the hitch member. The shock absorbing mechanism preferably includes one or more non-pressurized hollow elastomeric springs. One of the hitches is a compact receiver hitch wherein the mounting member is insertable into a hollow receiving member mounted on the towing vehicle and wherein the shock absorbing mechanism includes a housing mounted below the receiving member. Another of the hitches is configured as a fifth wheel or a gooseneck hitch and is adjustable for use with towed vehicles of varying weights.

24 Claims, 22 Drawing Sheets

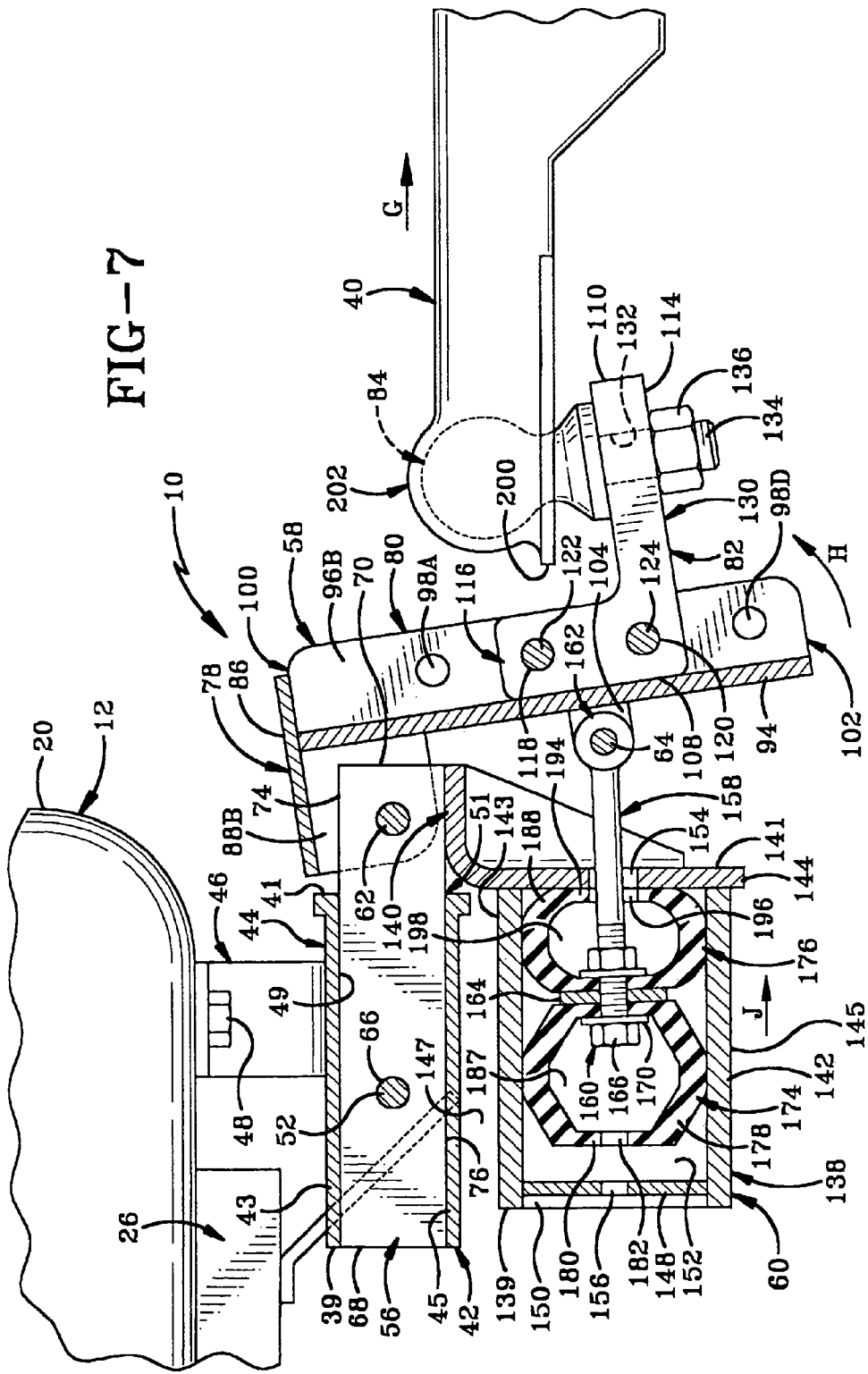

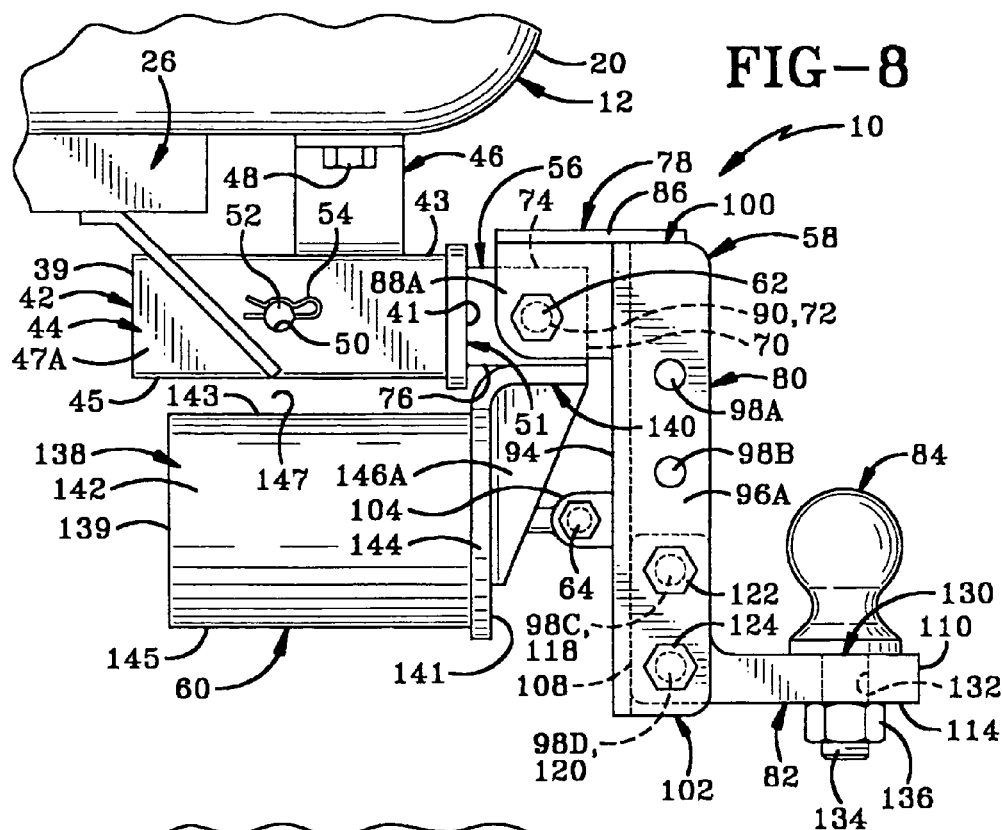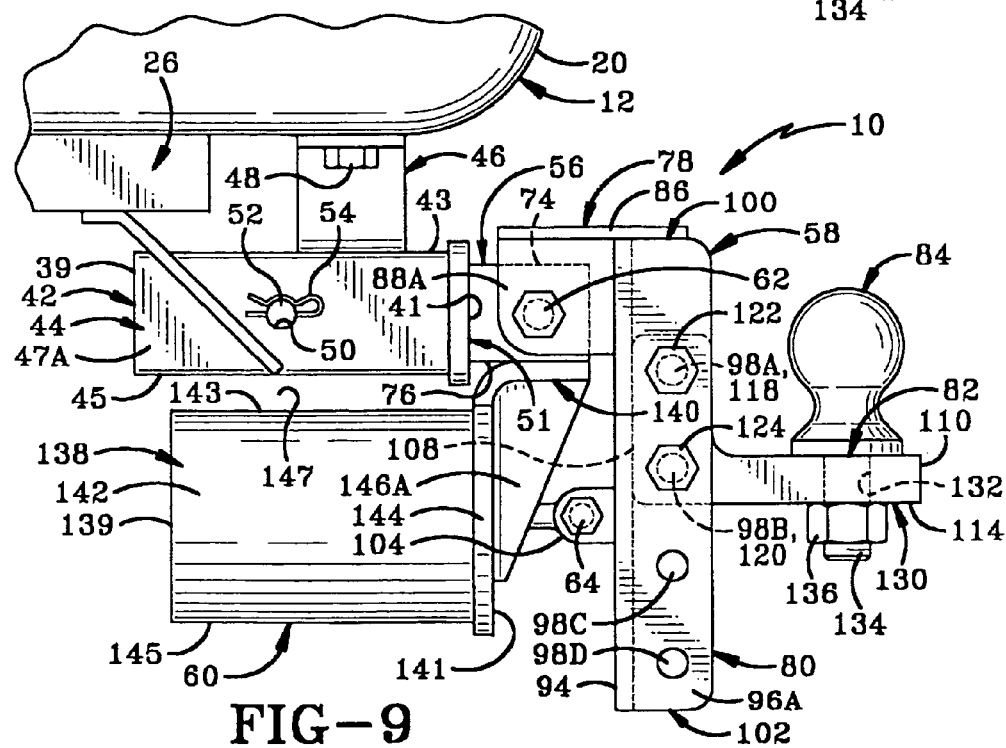

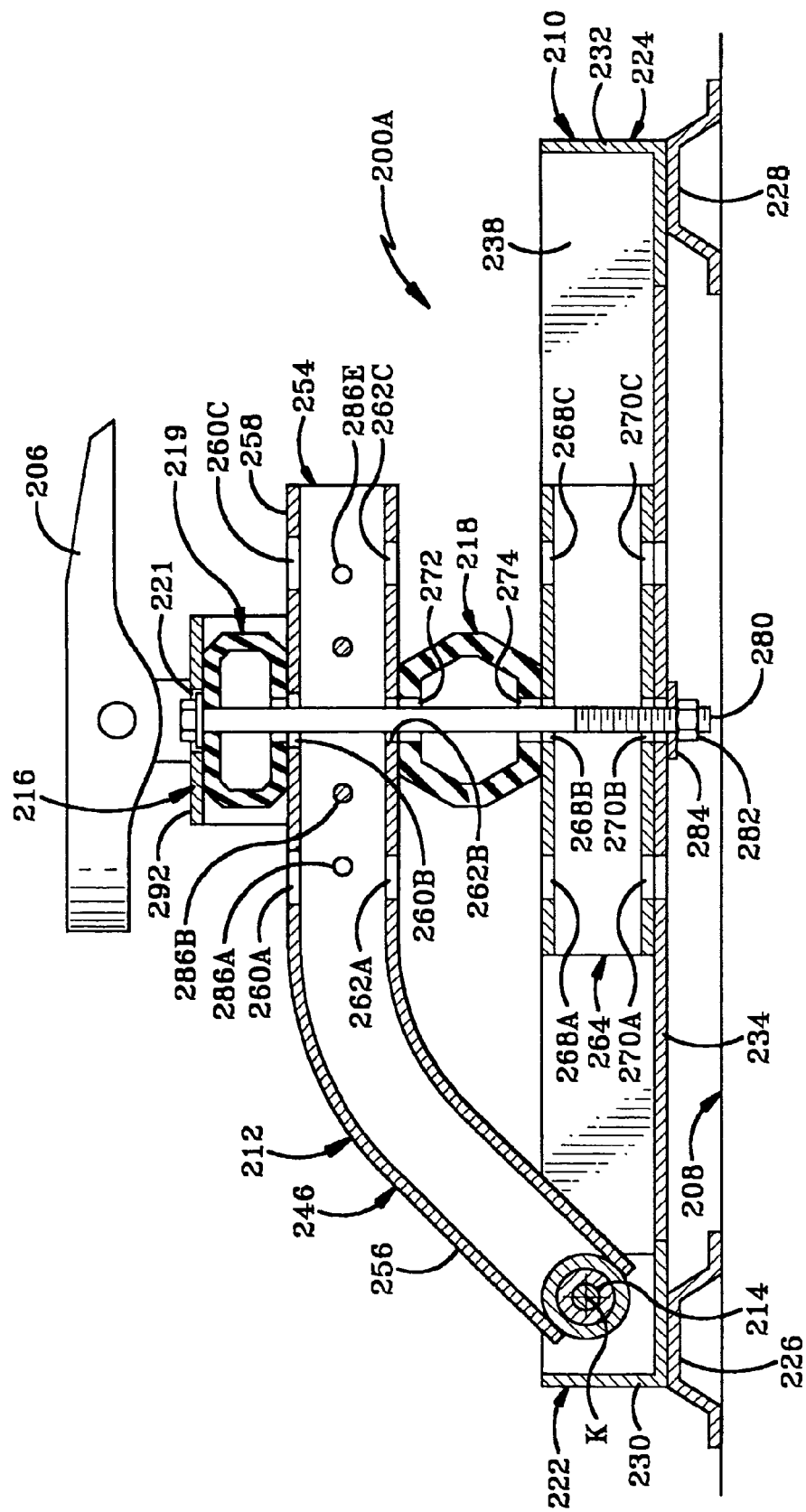

SHOCK ABSORBING TRAILER HITCH

CROSS REFERENCE TO RELATED APPLICATION

This application is a continuation of U.S. patent application Ser. No. 11/433,241, filed May 12, 2006; the disclosure of which is incorporated herein by reference.

BACKGROUND OF THE INVENTION

1. Technical Field

This invention relates generally to trailer hitches and more particularly to shock absorbing trailer hitches. More particularly, the present invention relates to a trailer hitch that minimizes the transmission of shock forces between a towing vehicle and a towed vehicle. Specifically, the invention relates to such a shock absorbing trailer hitch in which pivotal movement of the trailer hitch is absorbed by a shock absorbing mechanism.

2. Background Information

Various types of hitches and towing configurations are known in the art. Three typical trailer hitch configurations are generally known as receiver hitches, gooseneck hitches, and fifth wheel hitches. A receiver hitch typically extends beyond the rear bumper of the towing vehicle while gooseneck and fifth wheel hitches are disposed in the bed of the towing vehicle in front of the rear bumper. A problem common to all of these hitches is the transmission forces from the tow vehicle to the towing vehicle. Shock absorbing trailer hitches are generally known in the art for reducing the transfer of these forces. Several examples of such a shock absorbing hitch is disclosed in U.S. Pat. No. 5,683,094 granted to Gullickson. Gullickson discloses several embodiments each of which is configured to absorb forces in all directions. Each of these embodiments is configured with a socket mountable on a hitch ball which is rigidly mounted on the towing vehicle. One of the embodiments includes a larger diameter cylindrical shaft which is rigidly mounted on the socket and extends vertically upwardly therefrom with a smaller diameter cylindrical shaft mounted atop the larger diameter shaft. The smaller diameter shaft extends through an upper energy absorbing pad which mounts the cylindrical shafts to the towed vehicle in a manner which allows the shafts and socket to move vertically and to pivot about the upper elastomeric energy absorbent pad in all directions with respect to the towed vehicle. A cylindrical housing is rigidly mounted to the towed vehicle with an annular elastomeric energy absorbing pad disposed within the housing with the larger diameter cylindrical shaft extending through the central hole of the pad. Pivotal movement of the larger shaft is absorbed by the annular pad.

This embodiment of Gullickson is configured specifically for a gooseneck hitch and is not suitable for a receiver hitch where the socket of a trailer tongue is mounted directly to a hitch ball. In addition, the pivotal connection between the smaller diameter shaft and the towed vehicle via the upper elastomeric pad presents a concern over undue wear of the upper elastomeric pad over time.

In addition, a shock absorbing trailer hitch manufactured by TrailerSaver of Davison, Mich. utilizes pneumatic shock absorbers. More particularly, TrailerSaver makes shock absorbing hitches adapted for use with a fifth wheel or gooseneck connection. The primary drawback of the TrailerSaver hitches is the use of a pneumatic system, which requires associated apparatus in order to pressurize the pneumatic shock absorbers. For example, such pneumatic shock absorbers require pneumatic conduits and valves which may either be connected with a pneumatic system of a vehicle or to a compressor which is additionally provided for vehicles not having such a pneumatic system. The pneumatic shock absorbers and the associated equipment is susceptible to damage requiring the replacement thereof. In addition, the assembly of the pneumatic trailer hitches with a vehicle's pneumatic system requires additional assembly time.

Thus, there is room for improvement with regard to a shock absorbing trailer hitch wherein the hitch provides pivotal movement between the towing vehicle and the towed vehicle.

BRIEF SUMMARY OF THE INVENTION

The present invention provides a shock-absorbing trailer hitch for use between a towing vehicle and a towed vehicle, the trailer hitch comprising a first member adapted to engage the towing vehicle; a hitch member which is adapted to engage the towed vehicle and which is pivotally mounted on the first member about a single axis; and a shock absorbing mechanism comprising at least one non-pressurized first spring member for reacting pivotal movement of the hitch member.

The present invention also provides a shock-absorbing trailer hitch for use between a towing vehicle and a towed vehicle, the trailer hitch comprising a first member adapted to engage the towing vehicle; a hitch member which is adapted to engage the towed vehicle and which is pivotally mounted on the first member about a single axis; a shock absorbing mechanism comprising at least one first spring member for reacting pivotal movement of the hitch member in a first direction; wherein the hitch member includes a mounting location adapted for mounting the hitch member to the towed vehicle; and wherein one of the mounting location and the at least one first spring member is selectively positionable at a plurality of adjustment locations each of which is a different perpendicular distance from the axis.

BRIEF DESCRIPTION OF THE SEVERAL VIEWS OF THE DRAWINGS

FIG. 7 is similar to FIG. 6 and shows the first embodiment in an acceleration position associated with the acceleration of the towing vehicle and showing the hitch member of the trailer hitch and the towed vehicle moving in a rearward direction with respect to the towing vehicle.

FIG. 8 is a fragmentary sectional view similar to FIG. 2 showing the hitch ball of the hitch being vertically adjusted to a lowered position.

FIG. 9 is similar to FIG. 8 showing the hitch ball being vertically adjusted to a raised position.

FIG. 16A is similar to FIG. 14 and shows a variation of the second embodiment with the spring members in an alternate position.

Similar numbers refer to similar parts throughout the specification.

DETAILED DESCRIPTION OF THE INVENTION

Figure 1:
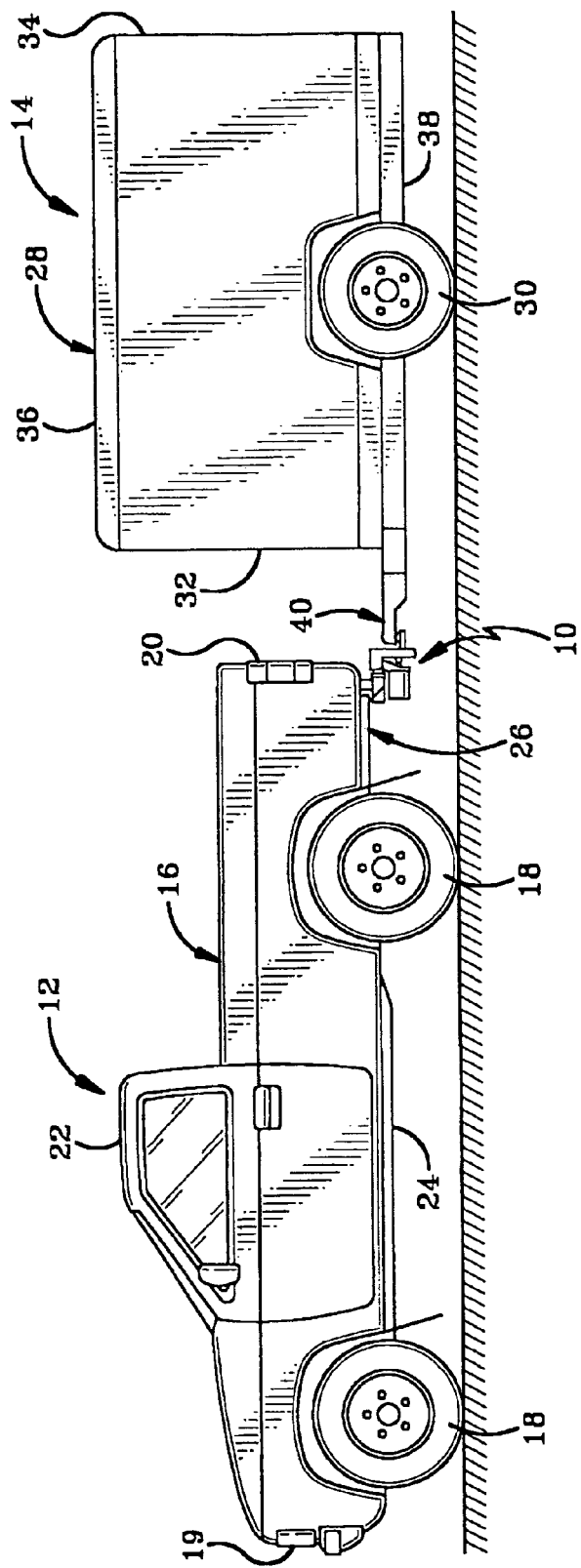
FIG. 1 is a side elevational view of a first embodiment of the trailer hitch of the present invention in use with a towing vehicle and a towed vehicle.
Figure 2:
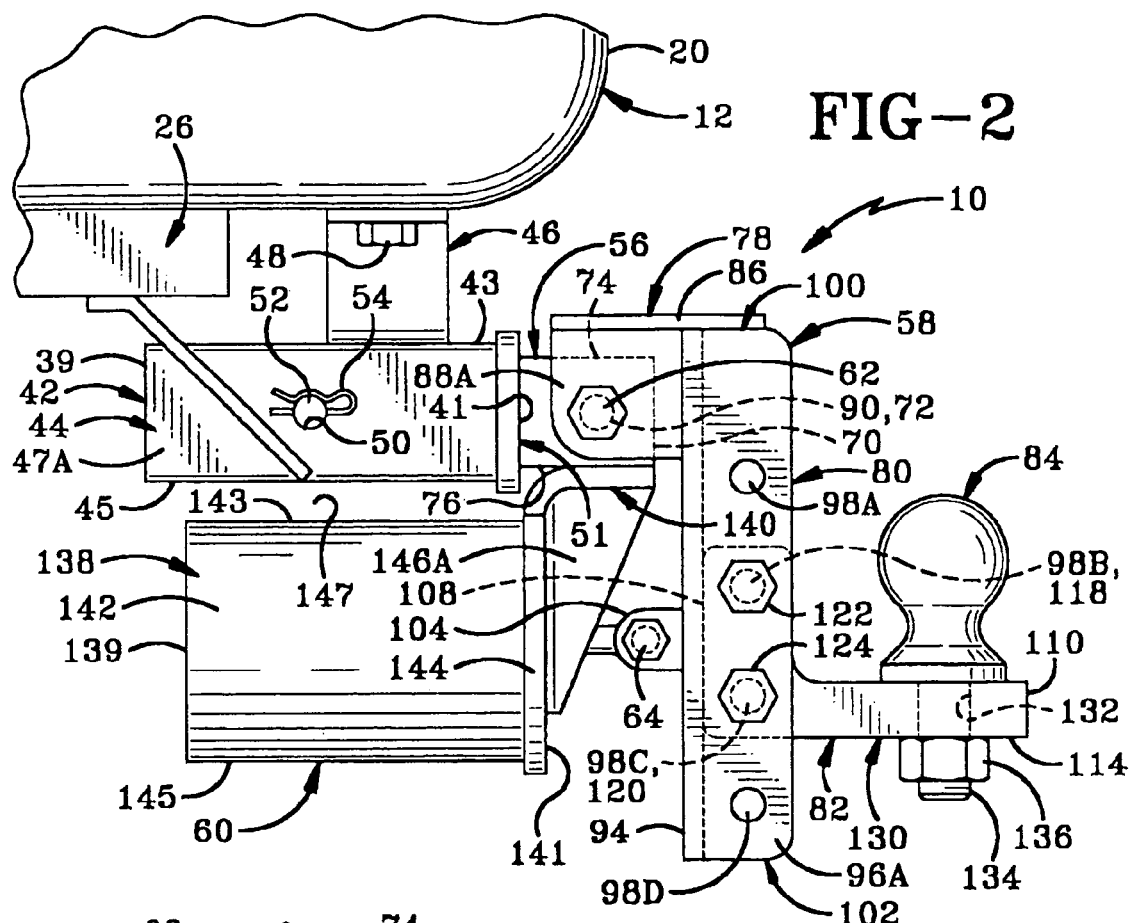
FIG. 2 is a fragmentary side elevational view of the first embodiment shown attached adjacent the rear of the towing vehicle.
Figure 3:
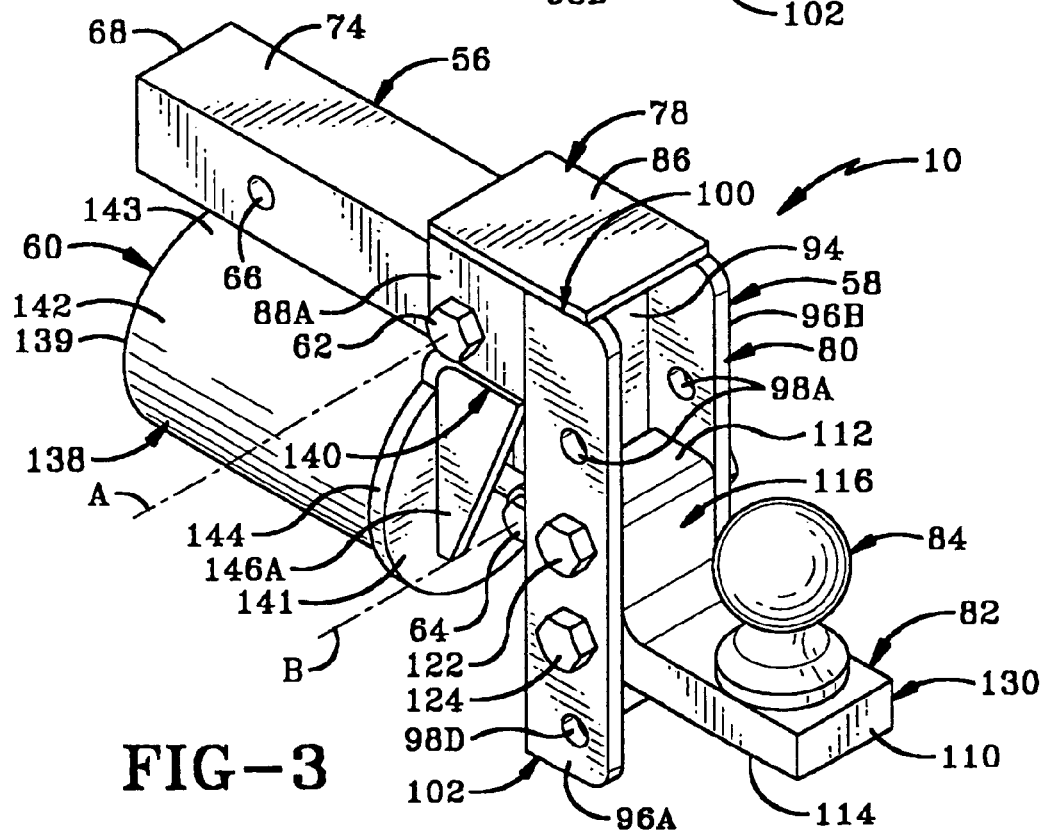
FIG. 3 is a perspective view of the first embodiment.
Figure 4:
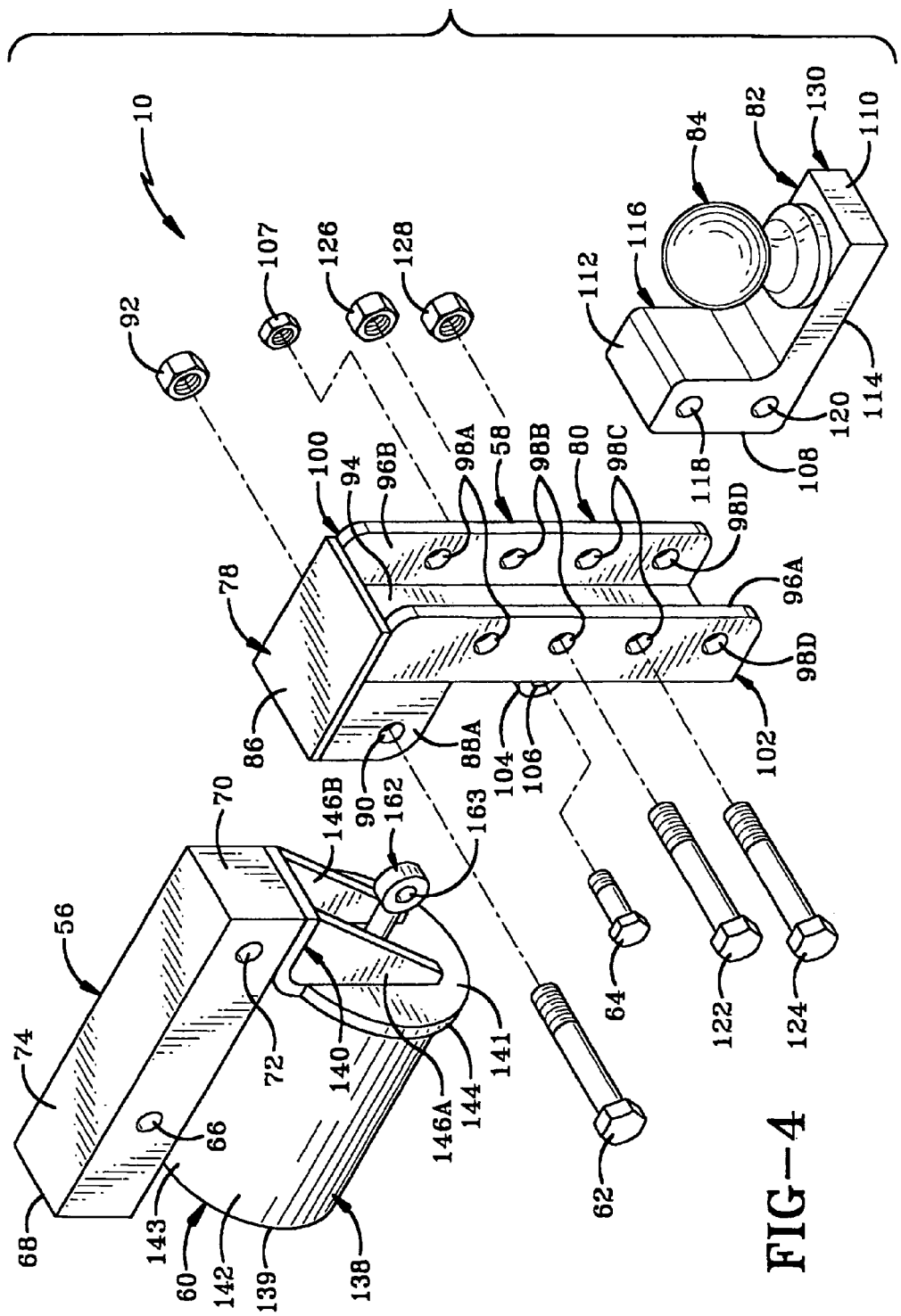
FIG. 4 is an exploded perspective view of the first embodiment.
Figure 17:
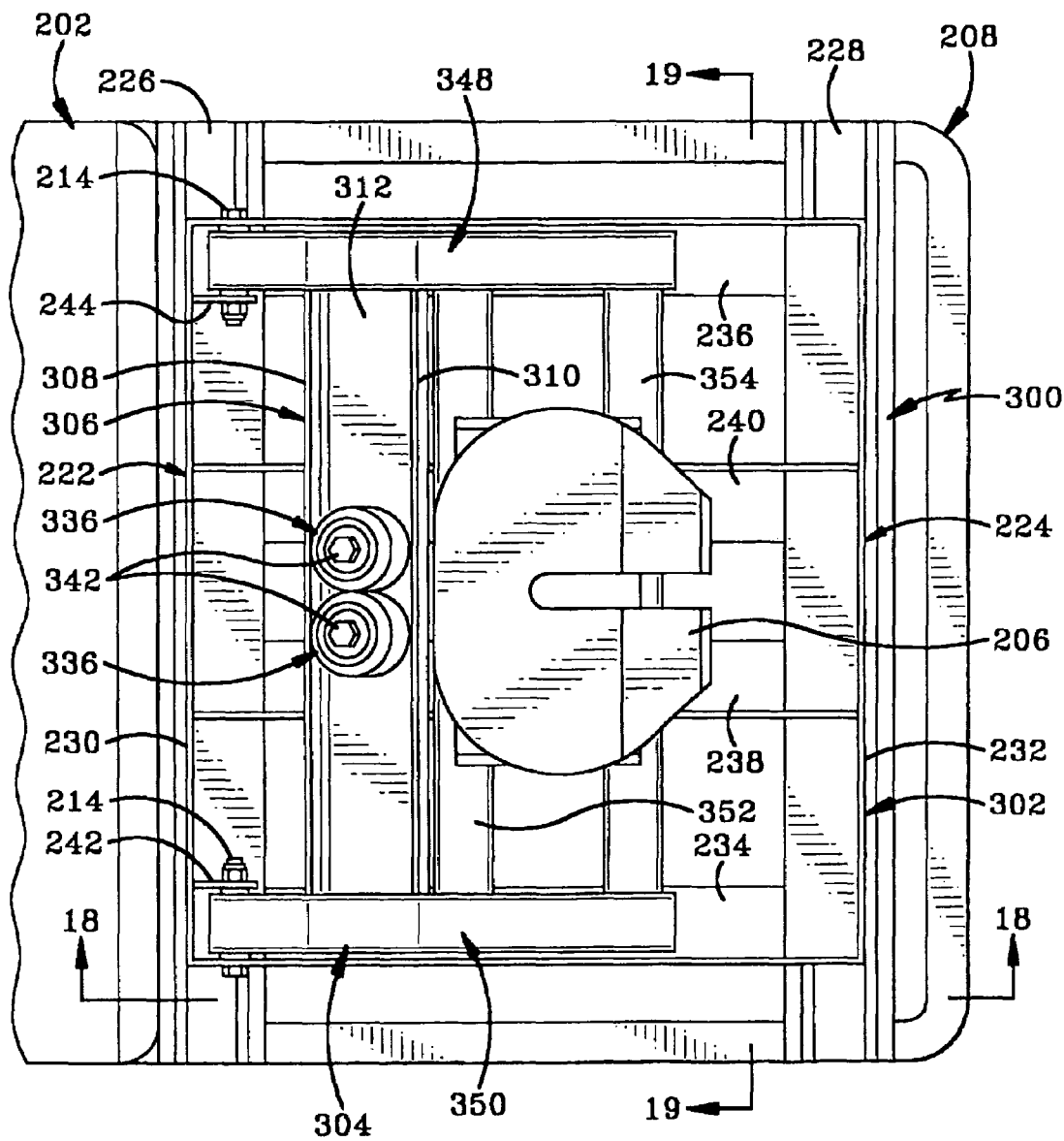
FIG. 17 is a top plan view similar to FIG. 11 showing a third embodiment of the trailer hitch of the present invention.
Figure 18:
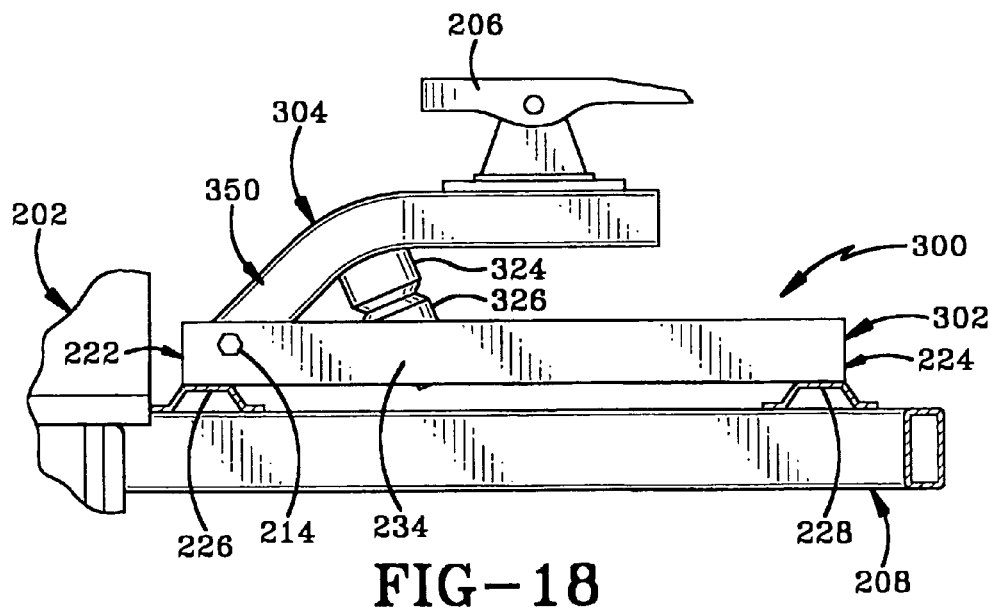
FIG. 18 is a sectional view taken on line 18-18 of FIG. 17.
Figure 19:
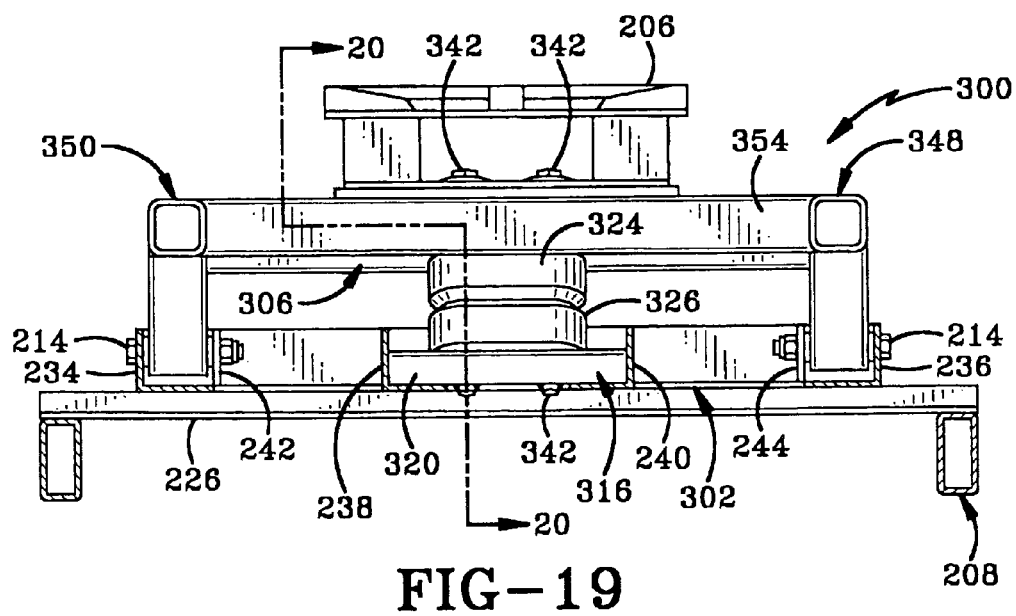
FIG. 19 is a sectional view taken on line 19-19 of FIG. 17.
Figure 20:
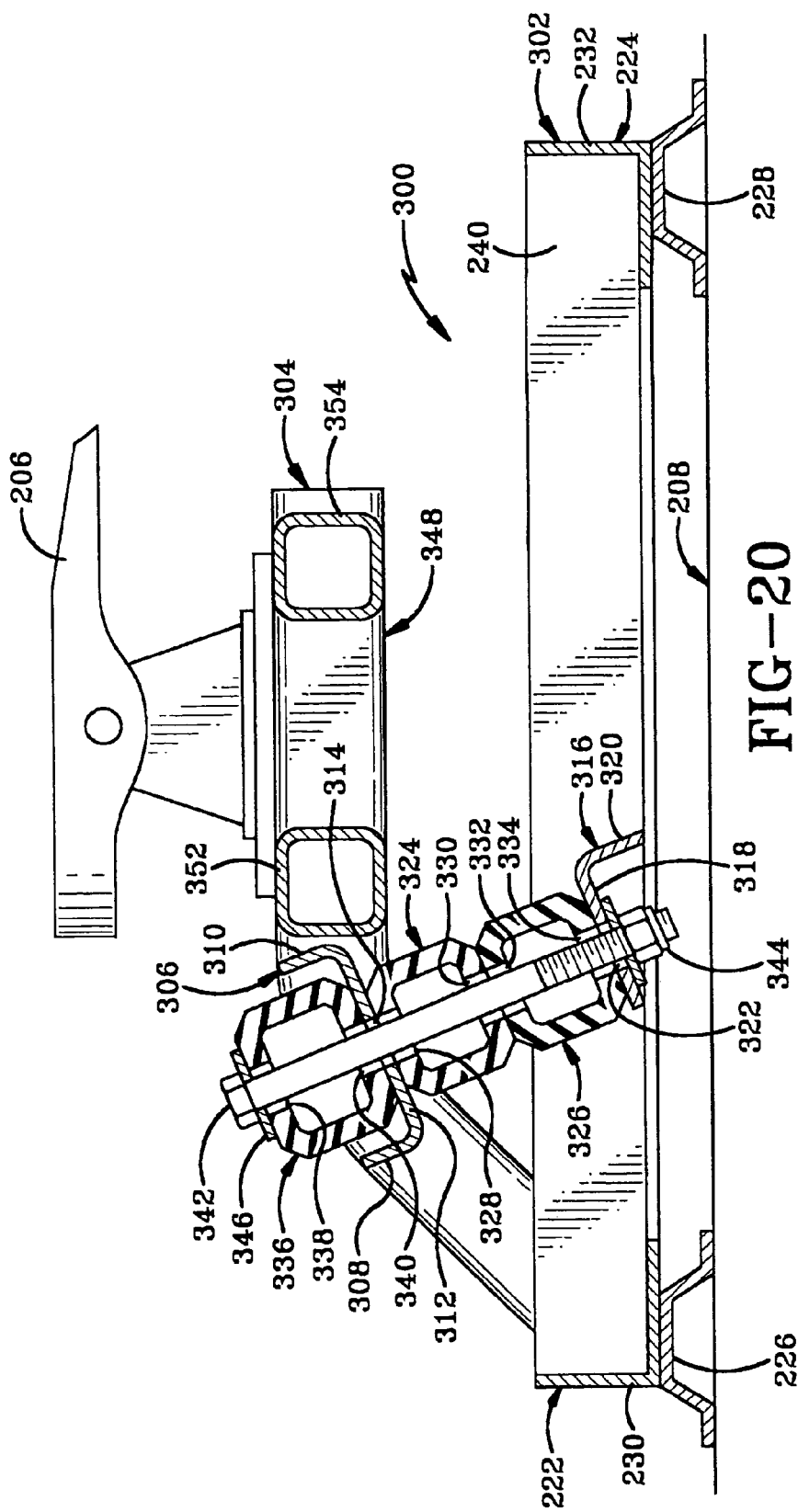
FIG. 20 is a sectional view taken on line 20-20 of FIG. 19.
Figure 23:
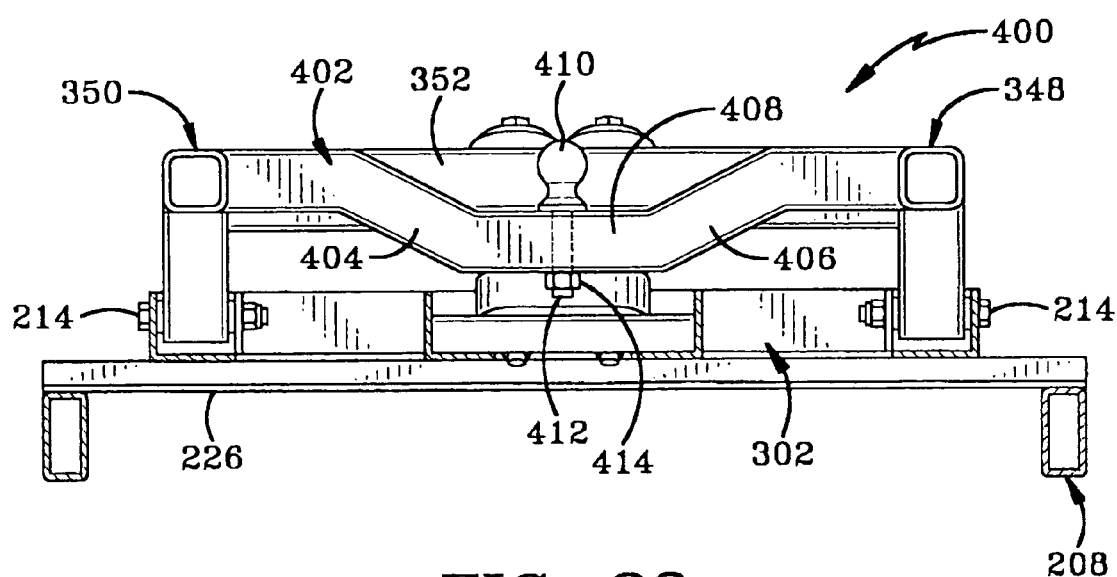
FIG. 23 is a sectional view similar to FIGS. 13 and 19 of a fourth embodiment of the present invention.

A first embodiment of the shock absorbing trailer hitch of the present invention is indicated generally at 10 in FIGS. 2-4; a second embodiment at 200 in FIGS. 10-13; and a third embodiment at 300 in FIGS. 17-19; and a fourth embodiment at 400 in FIG. 23. Referring to FIG. 1, hitch 10 is shown mounted on and between a towing vehicle 12 and a towed vehicle 14. Towing vehicle 12 has a body 16 mounted on a plurality of wheels 18. Body 16 has front and rear opposed ends 19 and 20, a top 22 and a bottom 24. Hitch 10 is mounted on a frame 26 adjacent rear end 20 of body 16 and adjacent bottom 24 of body 16. Towed vehicle 14 includes a body 28 mounted a pair of wheels 30. Body 28 has front and rear opposed ends 32 and 34, a top 36 and a bottom 38. Towing vehicle 28 further includes a coupler in the form of a mounting tongue 40 extending forwardly from front end 32 of body 28 adjacent bottom 38 of body 28.

With reference to FIG. 2, a rigid receiver 42 is rigidly mounted on frame 26 of towing vehicle 12 and includes a hollow elongated tubular receiving member 44 and a mounting flange 46 mounted on frame 26 via a plurality of bolts 48. Receiving member 44 has front and rear opposed ends 39 and 41 between which receiving member 44 is elongated. Receiving member 44 includes top and bottom walls 43 and 45 which are spaced from one another and extend from front end 39 to rear end 41. Member 44 further includes a pair of spaced sidewalls 47A and 47B (FIG. 5) each of which is connected to top wall 43 and bottom wall 45 and extends from front end 39 to rear end 41. Top wall 43, bottom wall 45 and sidewalls 47A and B define therewithin an interior chamber 49 (FIG. 5) having an entrance opening 51 adjacent rear end 41. Each of sidewalls 47A and B defines a hole 54 receiving there through a locking pin 52 which is held in place by a cotter pin 54. Hitch 10 is thus configured as a receiver hitch although it may be adapted to suit other hitch types, such as gooseneck and fifth wheel hitches.

In accordance with the feature of the invention, hitch 10 includes a rigid first member in the form of a mounting member 56, a rigid second member in the form of a hitch member 58 which is pivotally mounted on mounting member 56 and a shock absorbing mechanism 60 which is rigidly mounted on mounting member 56. More particularly, hitch member 58 is pivotally mounted on mounting member 56 at a pivot 62 about a substantially horizontal pivot axis A (FIG. 3) and hitch member 58 is pivotally mounted on shock absorbing mechanism 60 at a second pivot 64 about a second substantially horizontal pivot axis B (FIG. 3) so that axes A and B are substantially parallel.

Mounting member 56 is a solid member which is typically formed of steel or a similar suitably strong material and which is slidably received within interior chamber 49 of receiving member 44 via entrance opening 51. Mounting member 56 defines a through hole 66 which receives locking pin 52 when mounting member 56 is mounted within interior chamber 49 of receiving member 44 in order to mount hitch 10 to towing vehicle 12 via receiver 42 so that mounting member 56 is rigidly mounted on towing vehicle 12 via receiver 42 and is stationary with respect to towing vehicle 12 aside from any minor play in the connection involving locking pin 52. Mounting member 56 has a first or front end 68 and an opposed second or rear end 70 between which mounting member 56 is elongated in a longitudinal direction of hitch 10 which corresponds with a longitudinal direction of towing vehicle 12 which extends between front and rear ends 19 and 20 thereof and which is also the direction of travel of towing vehicle 12. Mounting member 56 defines a pivot hole 72 adjacent rear end 70 thereof for receiving pivot 62 therein. Pivot hole 72 is axially elongated in a substantially horizontal direction which is substantially perpendicular to the direction of travel of vehicle 12. Mounting member 56 has a substantially flat upper surface 74 and a substantially flat lower surface 76 on which shock absorbing mechanism 60 is mounted, as detailed further below. Front end 68 of mounting member 56 is disposed adjacent front end 39 of receiving member 44 when mounted thereon and a rearward portion of mounting member 56 adjacent rear end 70 thereof extends rearwardly from rear end 41 of receiving member 44.

Hitch member 58 includes a pivotal mounting member in the form of a first leg 78 which extends generally horizontally rearwardly from pivot 62 and second end 70 of mounting member 56. Hitch member 58 further includes a substantially vertically elongated second leg 80 which is connected to and extends downwardly from first leg 78. Hitch member 58 further includes a third leg 82 which extends substantially horizontally and rearwardly from second leg 80 and which is selectively vertically adjustable. Together, first, second and third legs 78, 80 and 82 form a generally Z-shaped structure. Second leg 80 and third leg 82 together form an L-shaped structure. Hitch member 58 further includes a coupler in the form of a hitch ball 84 which is mounted on and extends upwardly from third leg 82 so that second leg 80, third leg 82 and hitch ball 84 form a generally U-shaped configuration with second leg 80 and hitch ball 84 serving respectively as longer and shorter spaced legs extending upwardly from an intervening base in the form of a horizontal portion of third leg 82. Hitch ball 84 is depicted for the purpose of providing an example of other hitch structures known in the art, for example, a king pin or a pintle hitch.

First leg 78 is in the form of a channel having a substantially flat top wall 86 and a pair of spaced side walls 88A and 88B (FIG. 5) each of which extends downwardly from top wall 86 whereby top wall 86 and side walls 88 define the channel. Each side wall 88 defines a pivot hole 90 (FIG. 4) for receiving pivot 62 which is in the form a bolt which is mounted by a corresponding nut 92. When hitch member 58 is mounted on first member 56, a portion of first member 56 adjacent rear end 70 thereof is disposed between sidewalls 88A and B in the channel bounded thereby with hole 72 aligned with holes 90 and top wall 86 of first leg 78 spaced upwardly from upper surface 74 of first member 56 to allow pivotal movement of hitch member 58.

Second leg 80 includes a front wall 94 which is substantially flat and elongated in a substantially vertical direction. Front wall 94 substantially lies along a plane which is substantially vertical and perpendicular to the longitudinal direction of hitch 10 and the direction of travel of towing vehicle 12. Front wall 94 of second leg 80 is spaced rearward of rear end 70 of first member 56 to allow pivotal movement of hitch member 58. Second leg 80 further includes a pair of spaced sidewalls 96A and 96B which extend rearwardly and substantially perpendicularly from front wall 94 and are elongated in a substantially vertical direction. Each of sidewalls 96A and 96B are substantially the same length as front wall 94 and each sidewall 96 defines a plurality of mounting holes 98A-D which are vertically spaced from one another and substantially vertically aligned. Second leg 80 has a top 100 and opposed bottom 102 between which each of front wall 94 and sidewalls 96 is elongated in a substantially vertical direction. Hitch member 58 further includes a mounting flange 104 which is centrally positioned between side walls 96A and B and is connected to and extends outwardly from front wall 94 in a forward direction. Mounting flange 104 defines a pivot hole 106 for receiving pivot 64 there through in order to pivotally mount hitch member 58 to shock absorbing mechanism 60. Pivot 64 is in the form of a bolt which is mounted with a corresponding nut 107.

Third leg 82 has front and rear opposed ends 108 and 110, a top 112 and a bottom 114. Third leg 82 includes a first extension 116 which is elongated between top 112 and bottom 114 a substantially vertical direction. First extension 116 defines upper and lower mounting holes 118 and 120 which are selectively alignable with a pair of adjacent holes 98 of side walls 96 A and B of second leg 80 and which receive respectively upper and lower bolts 122 and 124 which also pass through respective holes 98 in order to secure the third leg 82 to second leg 80 along with corresponding nuts 126 and 128. First extension 116 is entirely disposed between sidewalls 96A and B when mounted on second leg 80 and is closely adjacent or abuts each of sidewalls 96A and B and front wall 94 when so mounted. Third leg 82 further includes a second extension 130 which extends forward from first extension 116 adjacent bottom 114 in a substantially horizontal direction. Second extension 130 is elongated between front end 108 and rear end 110. Second extension 130 defines a mounting hole 132 (FIG. 2) for mounting hitch ball 84 on second extension 130 of leg 82. More particularly, hitch ball 84 has a lower threaded portion 134 which extends downwardly through mounting hole 132 and engages a nut 136 for securing hitch ball 84 to second extension 130.

With reference to FIGS. 2-5, shock-absorbing mechanism 60 is further described. Mechanism 60 includes a rigid housing 138 and a rigid mounting flange 140 which is rigidly connected to mounting member 56 adjacent rear end 70 thereof to lower surface 76 of the portion of mounting member 56 which extends rearwardly from receiving member 44. Thus, mounting flange 140 is connected to mounting member 56 directly below pivot 62 and the corresponding pivot holes 90 and 72.

Housing 138 has front and rear opposed ends 139 and 141, a top 143 and a bottom 145. Front end 139 is disposed rearward of front end 68 of mounting member 56 and rear end 141 is disposed forward of rear end 70 of mounting member 56 so that front and rear ends 139 and 141 of housing 138 are disposed intermediate first and second ends 68 and 70 of mounting member 56. Front end 68 of mounting member 56 is thus the front most part of hitch 10. When hitch 10 is mounted on receiver 42, front end 139 of housing 138 is disposed rearward of front end 39 of receiving member 44. Thus, housing 138 is limited in its forward extension in order to prevent potential interference with other portions of towing vehicle 12, such as structural frame members which may extend downwardly or spare tires which may be mounted adjacent the bottom of the body of the vehicle.

Top 143 of housing 138 is disposed below and spaced from lower surface 76 of mounting member 56 and is substantially parallel to lower surface 76. Thus, top 143 of housing 138 and lower surface 76 of mounting member 56 define therebetween a space 147 which extends from front end 139 of housing 138 to adjacent rear end 141 thereof adjacent mounting flange 140. Thus, when mounting member 56 is mounted within interior chamber 49 of receiving member 44, bottom wall 45 of receiving member 44 is disposed between mounting member 56 and housing 138 within space 147. Thus, housing 138 is mounted in a cantilever fashion on mounting member 56 via mounting flange 140 and extends forward therefrom to define space 147. Thus, housing 138 is free of connections to the first member other than mounting flange 140.

Housing 138 includes a substantially cylindrical sidewall 142 which is substantially concentric about a longitudinal axis C (FIG. 5) which is substantially horizontal and perpendicular to each of axes A and B (FIG. 3). Side wall 142 is connected to and extends forward from a substantially flat and circular disc shaped rear wall 144 which is oriented substantially along a vertical plane perpendicular to axis C and the direction of travel of towing vehicle 12. Mounting flange 140 extends upwardly and then rearwardly from rear wall 144 and is formed with rear wall 144 as an integral one-piece member. A pair of strengthening members in the form of substantially triangular spaced strengthening plates 146A and 146B are connected to and extend rearwardly from rear wall 144 and upwardly to connect to mounting flange 140 to provide additional strength for mounting housing 138 on mounting member 56 in a rigid manner. Housing 138 further includes a front wall 148 which is disposed within a cavity 150 defined by cylindrical sidewall 142 and mounted to the inner surface of side wall 142. Front wall 148 is also a substantially flat plate or circular disc which is substantially aligned with a vertical plane parallel to that of rear wall 144. Side wall 142, rear wall 144 and front wall 148 define therebetween an interior chamber 152 of housing 138. Rear wall 144 defines a central rear entrance opening 154 disposed between strengthening plates 146A and B and front wall 148 defines a central front entrance opening 156.

All of or substantially all of hitch member 58 is disposed rearwardly of rearwall 144 of housing 138 with front wall 94 of second leg 80 spaced rearwardly from rear wall 144 sufficiently to prevent front wall 94 from contacting rear wall 144 during forward movement of second leg 80. Strengthening plates 146 are also tapered downward and forward to prevent contact with front wall 94 during forward movement thereof. In addition, pivot 62 and corresponding pivot holes 90 and 72 are disposed rearward of rear wall 144 of housing 138.

Shock absorbing assembly 60 further includes a rigid push rod 158 or a pivotable translating member having a first front end 160 and opposed second or rear end 162 between which push rod is longitudinally elongated in a generally horizontal orientation. Push rod 158 defines a pivot hole 163 adjacent rear end 162 thereof for receiving pivot 164 whereby push rod 158 is pivotally mounted on hitch member 58 via flange 104. Push rod 158 extends between plates 146A and B and through rear entrance opening 154 into interior chamber 152 of housing 138. Push rod 158 is threaded adjacent front end 160 thereof whereby a rigid moveable wall 164 is mounted on push rod 158 adjacent front end 160 via spaced forward and rearward nuts 166 and 168 and spaced forward and rearward washers 170 and 172 which are respectively in abutment with nuts 166 and 168 with said washers disposed between said nuts and said nuts threadably engaging push rod 158. Push rod 158 is disposed below and spaced from mounting member 56 and is generally parallel thereto so that push rod 158, mounting member 56 and the portion of hitch member 58 connected to and extending between push rod 158 and member 56 form a generally U-shaped configuration.

Shock absorbing assembly 60 further includes front and rear spring members 174 and 176 which are disposed within interior chamber 152 of housing 138 and which are preferably in the form of hollow non-pressurized rubber or elastomeric springs. Front spring member 174 includes a side wall 178, a front wall 180 which is connected thereto and defines a front opening 182, and a rear wall 184 which is connected to sidewall 178 and defines a rear opening 186. Side wall 178, front wall 180 and rear wall 184 define an interior chamber 187 of front spring member 174 with which front opening 182 is in fluid communication. Likewise, rear spring member 176 includes a sidewall 188, a front wall which is connected thereto and defines front opening 92 and a rear wall 194 which is connected to side wall 188 and defines a rear opening 196. Side wall 188, front wall 190 and rear wall 194 define an interior chamber 198 of rear spring member 176 with which rear opening 196 is in fluid communication.

Figure 5:
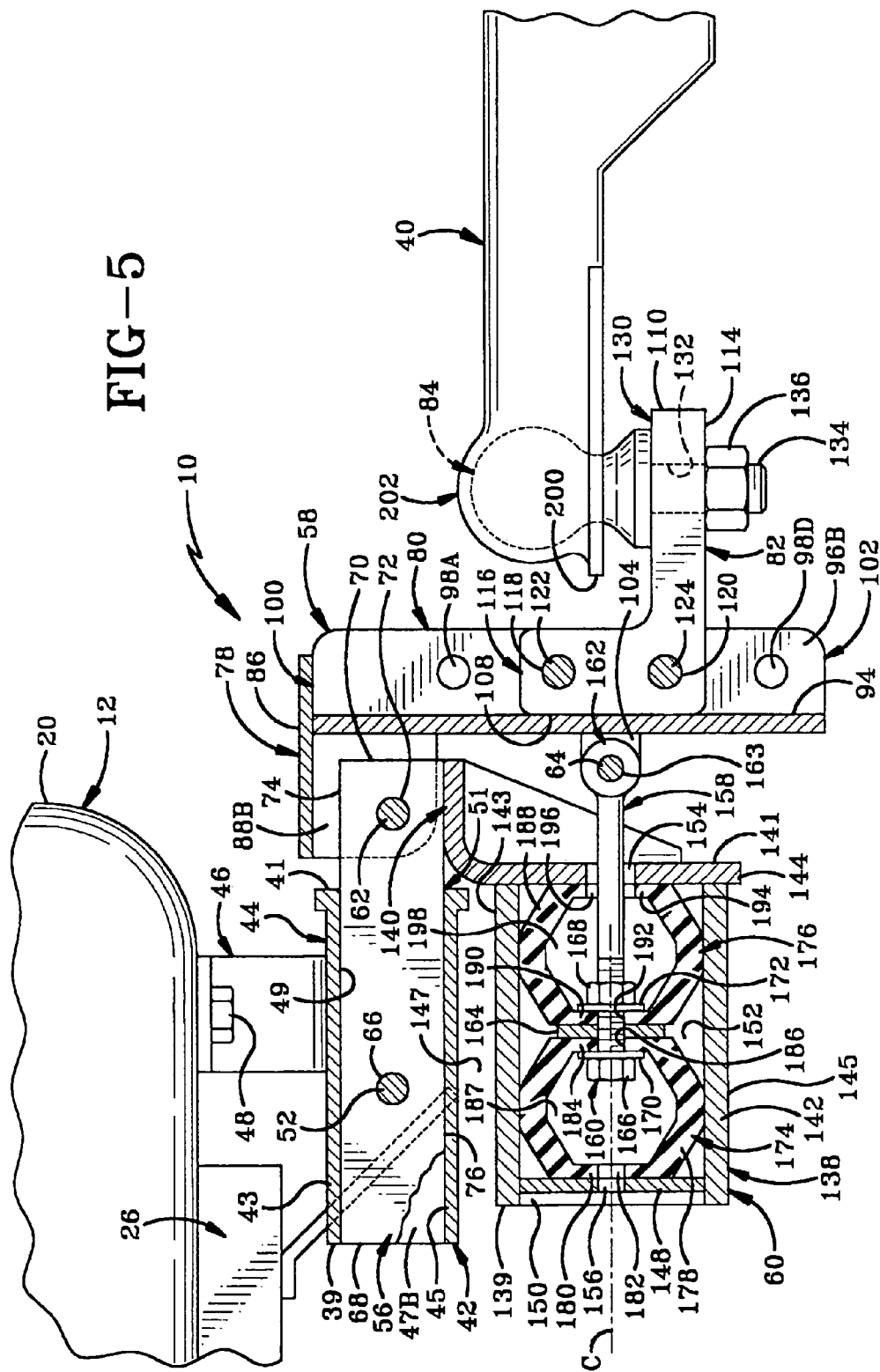
FIG. 5 is a fragmentary sectional view of the first embodiment in a resting position shown mounted on the towing vehicle and the towed vehicle.

In the resting position of hitch 10 shown in FIG. 5, spring members 174 and 176 are in a resting state in which they are non-compressed. Front wall 180 of front spring member 174 abuts an inner surface of front wall 148 of housing 138 with the front opening 182 aligned with front entrance opening 156 to allow air flow into and out of chamber 152 of housing 138 and chamber 187 of front spring member 174. Rear wall 184 of front spring member 174 is disposed forward of moveable wall 164 between wall 164 and forward washer 170 and is clamped therebetween with part of the threaded portion of push rod 158 extending through rear opening 186 of rearwall 184.

Front wall 190 of rear spring 176 is disposed rearward of moveable wall 164 between wall 164 and rearward washer 172 between which front wall 90 is clamped with a threaded portion of push rod 158 extending through front opening 192. In the resting position shown in FIG. 5, rear wall 194 of rear spring 176 abuts rear wall 144 of housing 138 with rear opening 196 aligned with rear entrance opening 154 to allow the flow of air into and out of interior chamber 152 of housing 138 and chamber 198 of rear spring member 176. A portion of push rod 158 also passes through rear opening 196 and extends across interior chamber 198.

Thus, forward nut 166, forward washer 170 and front end 160 of push rod 158 are all disposed within interior chamber 187 of first spring 174 while rearward nut 168, rearward washer 172 and a portion of push rod 158 are all disposed within interior chamber 198 of rear spring member 176. In addition, each of sidewalls 178 and 188 of spring members 174 and 176 have an outer substantially circular or cylindrical portion which contacts the inner surface of side wall 142 of housing 138 along an inner surface thereof. Push rod 158 is moveable longitudinally in forward and rearward directions substantially along axis C so that moveable wall 164, rear wall 184 of front spring member 174 and front wall 190 of rear spring member 176 are likewise moveable in response to movement of push rod 158. In addition, front and rear spring members 174 and 176 are generally moveable in forward and rearward directions and more particularly are slidable within interior chamber 152 of housing 138 in forward and rearward directions. Thus, spring members 174 and 176 are moveable forward and away from each of front and rear walls 148 and 144 of housing 138. More particularly, front wall 180 of front spring 174 is movable into and out of contact with front wall 148, and rear wall 194 of rear spring member 176 is movable into and out of contact with rear wall 144 of housing 138.

With reference to FIG. 5, tongue 40 of towed vehicle 14 has a front end 200 adjacent which tongue 40 includes a socket 202 for selectively receiving hitch ball 84 for mounting towed vehicle 1.4 to hitch ball 84 of hitch 10 to form a hitch connection therebetween in a standard manner.

Figure 6:
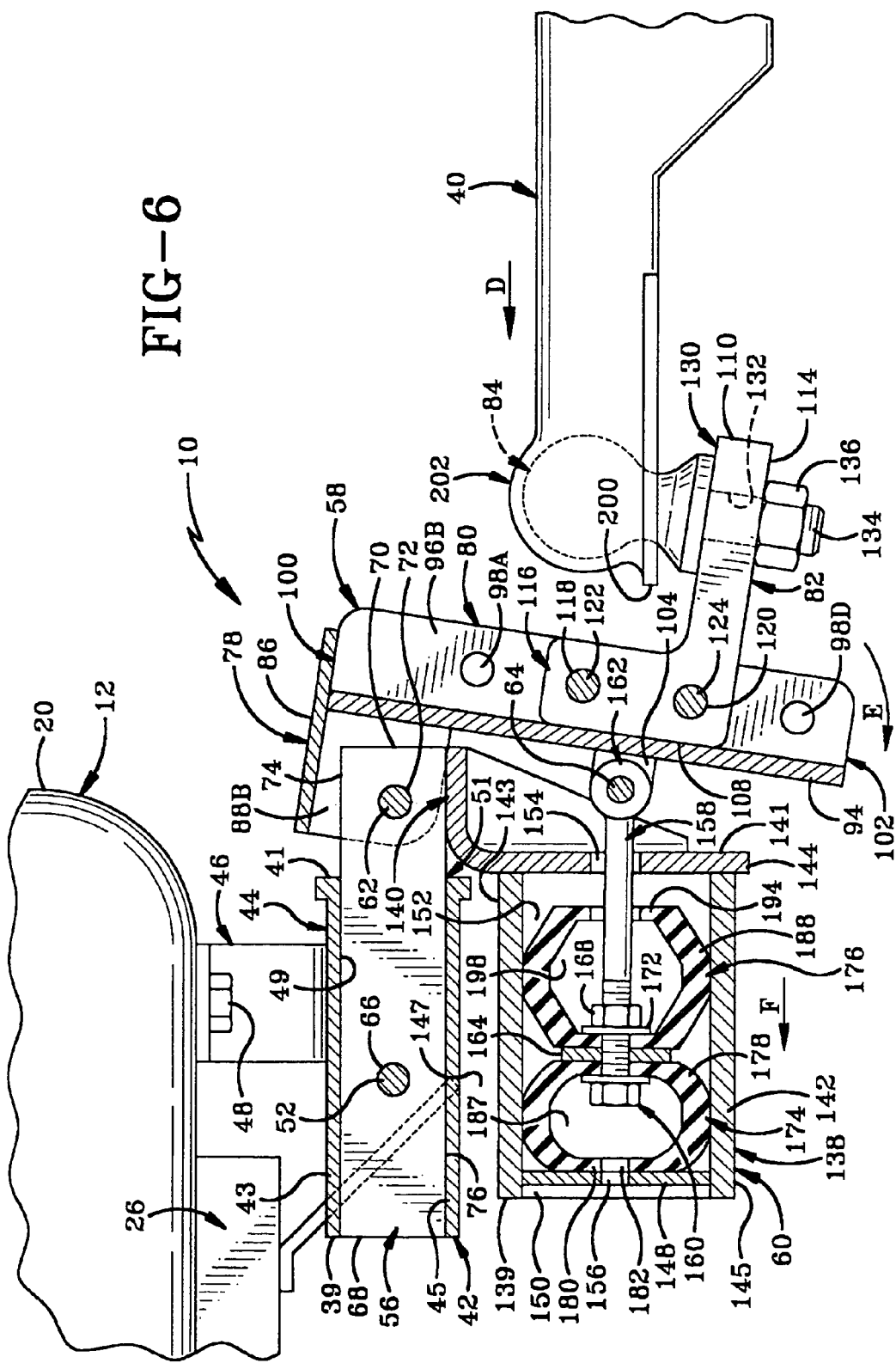
FIG. 6 is similar to FIG. 5 and shows the first embodiment in a deceleration position associated with the slowing of the towing vehicle wherein the hitch member of the trailer hitch and towed vehicle are moving in a forward direction with respect to the towing vehicle.

With reference to FIGS. 6 and 7, the operation of hitch 10 is now described. FIG. 6 shows the operation of hitch 10 during deceleration of towing vehicle 12 and towed vehicle 14. More particularly, when towing vehicle 12 decelerates due to the application of brakes or other reasons, towed vehicle 14 tends to continue forward movement as indicated by arrow D in FIG. 6. The forward movement of towed vehicle 14 and tongue 40 with respect to towing vehicle 12 and mounting member 56 causes hitch member 58 to pivot about pivot 62 as indicated at arrow E to cause the forward movement of push rod 158 as indicated at arrow F via pivotable movement of push rod 158 about pivot 64. This forward movement of tongue 40 of towed vehicle 14 and the associated decelerating force thereof is reacted by front spring member 174 whereby spring member 174 is a deceleration force absorbing spring member. More particularly, spring member 174 (primarily sidewall 178) is generally compressed by movable wall 164 so that interior chamber 187 of front spring member 174 is reduced in volume and air is expelled via front opening 182 of front wall 180 and front entrance opening 156 of front wall 148 of housing 138 into the atmosphere external to spring member 174 and housing 138. Meanwhile, rear spring member 176 remains in its resting state while it is slidably moved in a forward direction within interior chamber 152 of housing 138 so that rear wall 194 thereof moves out of contact With rear wall 144 of housing 138. Thus, bottom 102 of second leg 80 of hitch member 58 moves forward and downward during this deceleration. In addition, the pivotal movement of hitch member 58 allows hitch ball 84 and socket 202 of tongue 40 to move forward and downward during the deceleration of vehicles 12 and 14. The downward movement in particular provides an additional safety factor in maintaining stability of towed vehicle 14 and applying greater downward force on the rear of towing vehicle 12 to maintain good braking capabilities particularly in the rear wheels thereof.

FIG. 7 shows the operation of hitch 10 during acceleration of vehicles 12 and 14 whereby towed vehicle 14 moves rearwardly as indicated by arrow G with respect to towing vehicle 12. The movement of hitch 10 is generally opposite to that described with regard to the deceleration of vehicles 12 and 14 shown in FIG. 6. More particularly, hitch member 58 pivots rearwardly and upwardly as indicated by arrow H in response to the movement and force of tongue 40 and vehicle 14 as indicated by arrow G. Push rod 158, moveable wall 164 and spring members 174 and 176 all move rearwardly as indicated by arrow J in response to the pivotal movement of hitch member 58. More particularly, front spring member 174 moves slidably rearwardly in its resting state with front wall 180 thereof moving out of contact with front wall 148 of housing 138. Rear spring member 176 (primarily sidewall 188) is generally compressed by movable wall 164 with rear wall 194 in contact with rear wall 144 of housing 138. The compression of rear spring 176 decreases the volume of interior chamber 198 and expels air therefrom via rear opening 196 and rear entrance opening 154 of wall 144. Thus, rear spring member 176 serves as an acceleration force absorbing spring member.

FIGS. 8 and 9 show the operation of a height adjustment mechanism for vertically adjusting the height of hitch ball 84 and third leg 82. FIG. 8 shows hitch ball 84 and third leg 82 adjusted to a lower position with bolts 122 and 124 respectively disposed in mounting holes 98C and 98D of second leg 80. FIG. 9 shows hitch ball 84 and third leg 82 adjusted to a raised or upper position with bolts 122 and 124 respectively disclosed in mounting holes 98A and 98B of second leg 80. The earlier figures show hitch ball 84 and third leg 82 in middle position with bolts 122 and 124 disposed respectively in mounting holes 98B and 98C. This height adjustment mechanism allows for matching up the height of hitch ball 84 with a given socket and tongue of a towing vehicle and additionally changes the amount of torque force experienced by a spring member 174 and 176 during acceleration and deceleration of the vehicles. More particularly, due to the leverage provided by second leg 80 of hitch member 58, the lowered position shown in FIG. 8 increases the torque force in comparison to the middle position and raised position while the raised position shown in FIG. 9 reduces the torque force with respect to the middle position and the lower position of hitch ball 84 and third leg 82. Thus, the vertical adjustment of hitch ball 84 effectively varies the amount of weight of a towing vehicle 14 which can be used with a given set of spring members 174 and 176.

Thus, the present invention provides a shock absorbing hitch which is simple and cost effective. While hitch 10 is particularly configured for use with a receiver such as receiver 42 mounted on a towing vehicle, it will be evident that hitch 10 may be modified for use with other types of hitch arrangements. Various changes which are within the scope of the invention will be evident to one skilled in the art. For instance, while the pivotal movement of hitch member 58 preferably forward and downward with respect to deceleration of the towing and towed vehicles, this particular movement may occur in different planes wherein the movement is not downward or necessarily forward. In addition, a push rod or the like may be connected to a shock absorbing assembly without using a pivotal connection.

While hitch 10 is configured for use with a receiver, such as receiver 42, it is understood that mounting member 56 or a similar mounting member may be configured to mount directly to the frame of a towing vehicle. Shock absorbing mechanism 60 or a similar mechanism may be attached directly to the frame of a vehicle without being attached directly to a mounting member such as member 56. However, the attachment of the shock absorber mechanism to the mounting member simplifies the configuration and makes it more compact. Further, the shock absorbing mechanism may be of a variety of types although elastomeric springs are preferred and especially non-pressurized spring members are preferred in order to provide a simple shock absorbing element which requires little maintenance. Preferably, a housing such as housing 138 substantially encloses the spring members in order to protect them from the elements as much as possible. However, a shock absorbing mechanism may be configured without such a housing. In addition, the vertical adjustment to the hitch ball may be eliminated without departing from the scope of the invention, although this provides additional benefits as discussed herein. In addition, while hitch balls such as hitch ball 84 are generally used with trailers having a tongue with a socket, the hitch of the present invention may be configured without a hitch ball where the coupler or hitch connection to the towing vehicle has an alternate configuration. Other changes will be evident to one skilled in the art.

Figure 10:
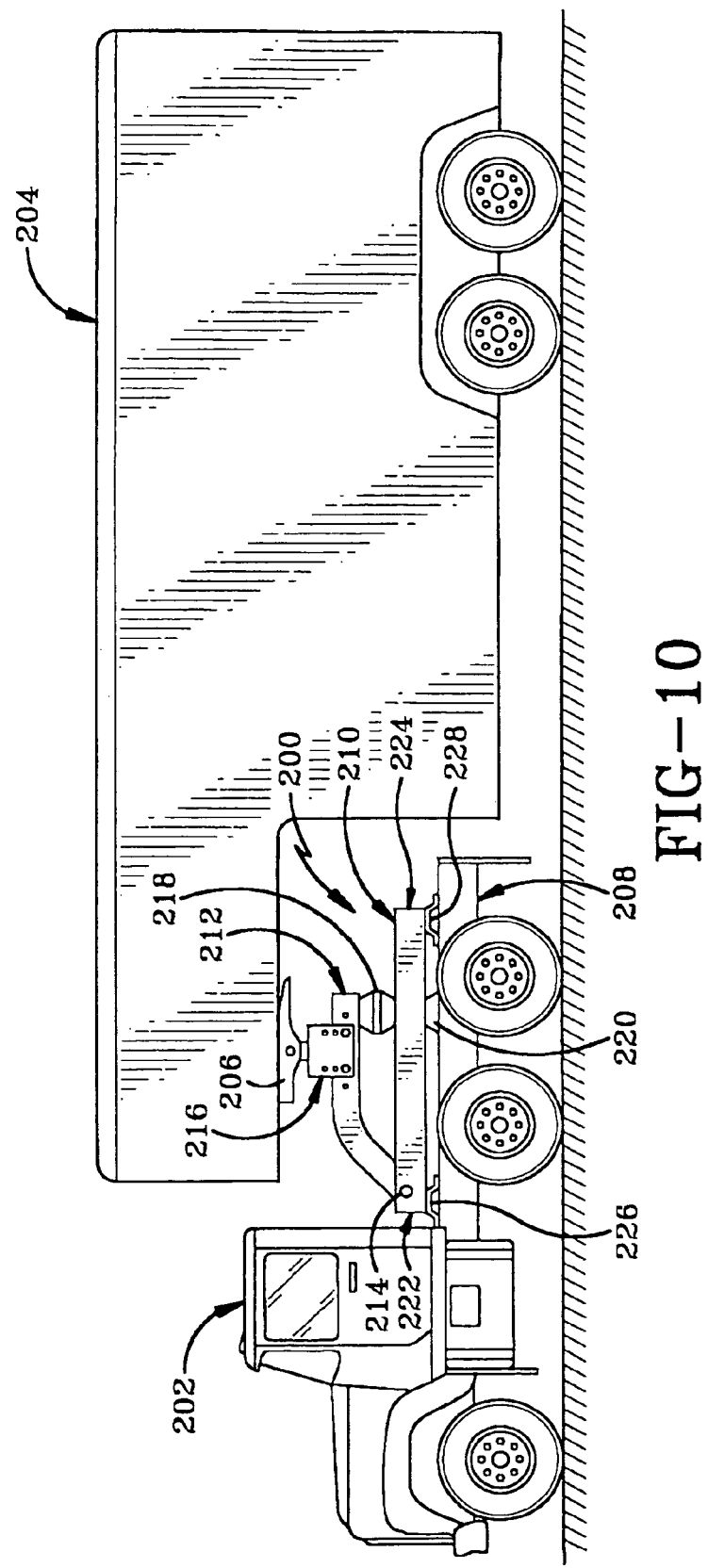
FIG. 10 is a side elevational view of a second embodiment of the trailer hitch of the present invention in use with a towing vehicle and a towed vehicle.
Figure 11:
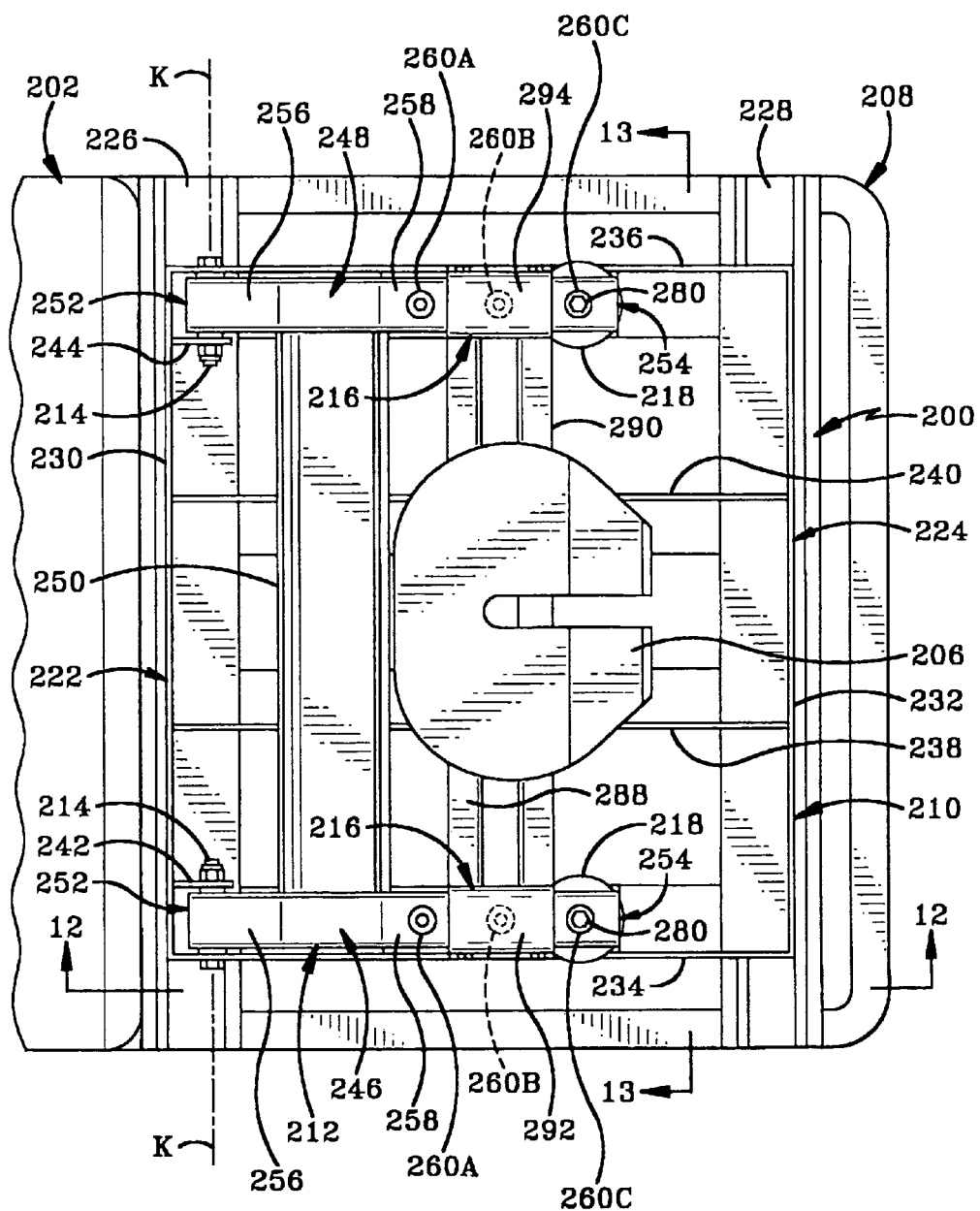
FIG. 11 is a top plan view of the second embodiment shown mounted on the frame of the towing vehicle.

Shock absorbing hitch 200 will now be described with references to FIGS. 10-16. FIG. 10 shows hitch 200 mounted on a towing vehicle 202 in the form of a tractor and a towed vehicle 204 which has a coupler for coupling to a fifth wheel 206 mounted atop hitch 200. More particularly, hitch 200 includes a rigid base or first member 208 which is rigidly mounted on frame 208 and a hitch member 212 which is pivotally mounted on first member 210 about a substantially horizontal and axially extending axis K (FIG. 11) of axially spaced pivots 214. Fifth wheel 206 is mounted on hitch member 212 via a vertical adjustment mechanism 216. Hitch 200 further includes a shock absorbing mechanism which includes a pair of axially spaced first spring members 218 and a pair of axially spaced second spring members 220. First spring members 218 and second spring members 220 respectively react pivotal movement of hitch member 212 in opposite directions. Hitch 200 has front and rear opposed ends 222 and 224 which define therebetween a longitudinal direction of the hitch which is aligned with the longitudinal direction of the towing vehicle and the towed vehicle when the towed vehicle is pulled directly behind the towing vehicle during straight travel. First member 210 is mounted on frame 208 via front and rear mounting rails 226 and 228 which extend axially and may be in the form of what is commonly referred to in the art as Reese rails.

In the exemplary embodiment, the first member is in the form of a substantially rectangular framework as viewed from above although various configurations may be suitable for the purpose. More particularly, first member 210 includes front and rear cross bars 230 and 232 which are spaced from one another and extend axially. First member 210 further includes first and second side bars 234 and 236 which extend longitudinally and connect respectively with each of front and rear cross bars 230 and 232 adjacent respective ends of the cross bars and side bars to form respective corners of the rectangular framework of first member 210. First member 210 further includes first and second intermediate members 238 and 240 which extend longitudinally between and are connected to each of front and rear cross bars 230 and 232. Intermediate bars 238 and 240 are disposed between side bars 234 and 236 and are spaced axially from one another. These various elements of first member 210 are rigidly mounted to one another at their respective connections, typically by welding. First member 210 further includes first and second mounting brackets 242 and 244 which includes a pair of spaced flanges defining respective holes through which pivots 214 extend. Respective portions of side bars 234 and 236 adjacent front cross bar 230 serve as one of the flanges of the respective mounting brackets 242 and 244.

Hitch member 212 includes first and second pivot arms 246 and 248 which are axially spaced from one another and extend longitudinally rearwardly from a respective one of pivots 214 where they are pivotally mounted to first member 210. Hitch member 212 further includes a cross bar 250 which extends between and is rigidly connected to each of pivot arms 246 and 248. Each of the pivot arms has front and rear opposed ends 252 and 254 and is pivotally connected to first member 210 adjacent the respective front end 252 thereof. Each pivot arm includes a front segment 256 and a rear segment 258 which extends rearwardly from front segment 256. More particularly, front segment 256 angles upwardly and rearwardly from pivot 214 to a curved intersection with rear segment 258, which extends rearwardly therefrom in a generally horizontal manner so that each rear segment 258 is generally parallel to and spaced upwardly of a respective side bar 234 and 236 of first member 210. Cross bar 250 is substantially straight and is connected to each of the pivot arms along the intersection between front and rear segments 256 and. 258.

Figure 14:
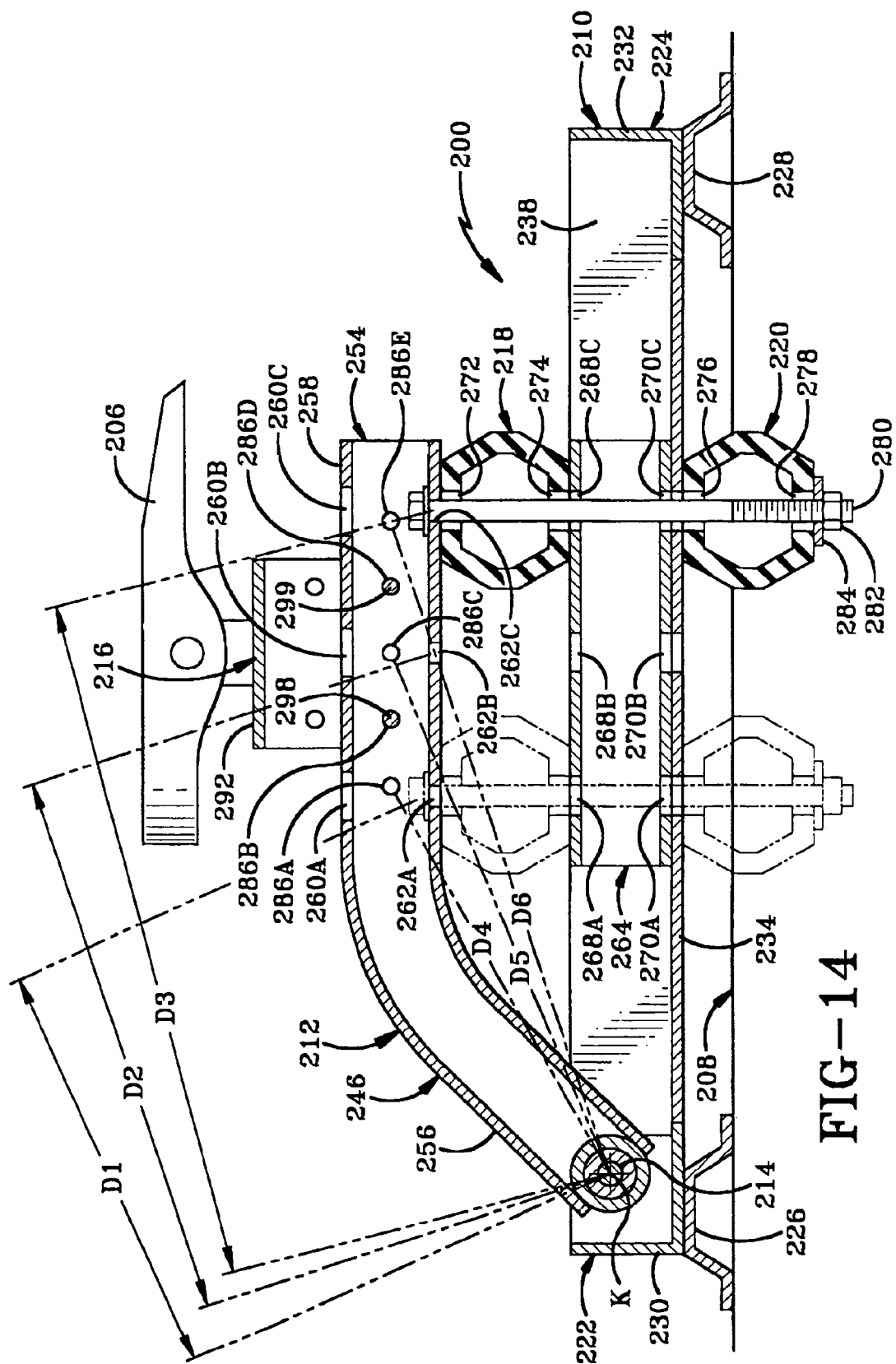
FIG. 14 is a sectional view taken on line 14-14 of FIG. 13.

In the exemplary embodiment, pivot arms 246 and 248 are each tubular members having a substantially square cross section and thus include upper and lower spaced walls and a pair of spaced side walls connected thereto. A plurality of longitudinally spaced holes are formed in each of the upper and lower walls of rear segment 258 of each pivot arm. In the exemplary embodiment, each upper wall of rear segment 258 defines three holes 260A, 260B and 260C (FIG. 14). The lower wall of rear segment 258 defines three holes 262A, 262B and 262C which are respectively aligned with holes 260A-C. More particularly, holes 260A-C are respective perpendicular distances from axis K which are different from one another. This is also true of each of holes 262A-C. FIG. 14 shows in particular that hole 262A and axis K define therebetween a perpendicular distance D1, that hole 262B and axis K define therebetween a distance D2 and that hole 262C and axis K define therebetween a perpendicular distance D3 wherein each of the distances is different from one another. For clarity, the corresponding distances between axis K and each of holes 260A-C is not explicitly shown in FIG. 14 but is represented by analogy via distances D1, D2 and D3.

Figure 13:
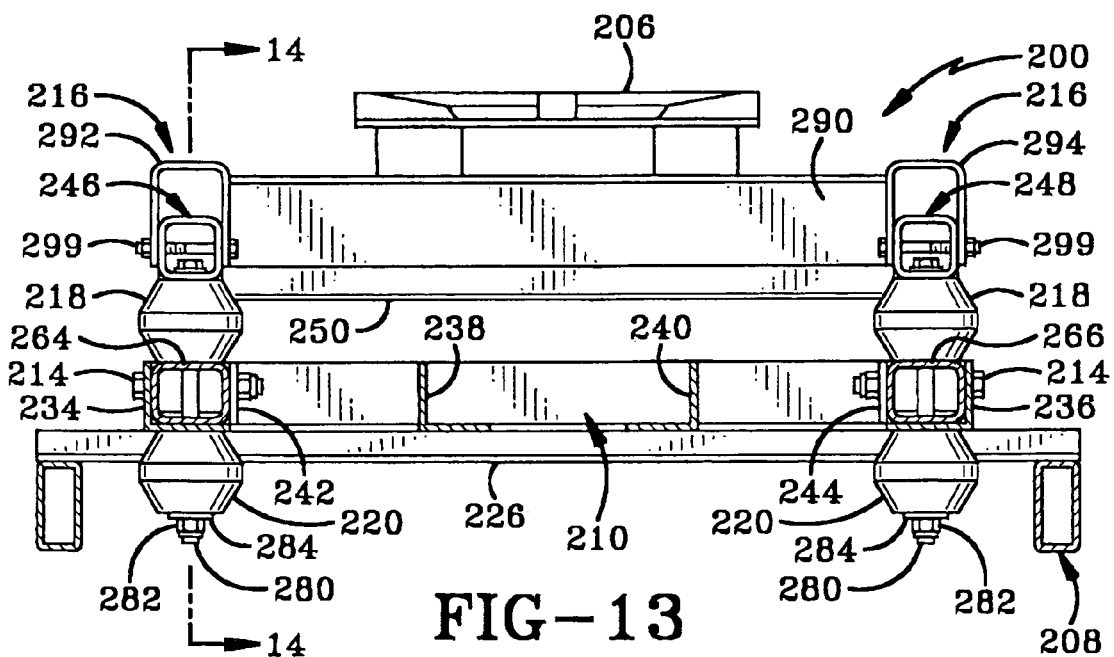
FIG. 13 is a sectional view taken on line 13-13 of FIG. 11.

FIGS. 13 and 14 further show that first member 210 includes a pair of spaced tubular members 264 and 266 which extend longitudinally and are rigidly mounted respectively on first and second side bars 234 and 236. As shown in FIG. 14, the upper wall of each tubular member 264 defines longitudinally spaced holes 268A, 268B and 268C which are respectively aligned with holes 260A-C and holes 262A-C. Similar holes are formed therebelow in the bottom wall of tubular member 264 and a lower wall of each of cross bars 234 and 236. For simplicity, these lower holes adjacent one another are referred to as a single hole. More particularly, these lower holes are referenced as holes 270A, 270B and 270C, which are respectively aligned with holes 268A-C.

With further reference to FIG. 14, each first spring member 218 is preferably a hollow elastomeric cushion having upper and lower walls which respectively define upper and lower holes 272 and 274. Each second spring member 220 has a similar configuration and thus defines upper and lower holes 276 and 278. The shock absorbing mechanism further includes a fastener in the form of a bolt 280. In the position shown in FIG. 14, bolt 280 extend through each of holes 262C, 272, 274, 268C, 270C, 276 and 278. The head of the bolt is disposed in the interior chamber of the respective pivot arm and a nut 282 threadedly engages the lower end of bolt 280 with a retaining plate or enlarged washer 284 disposed between nut 282 and the bottom wall of spring member 220. Bolt 280 thus connects spring members 218 and 220 to first member 210 and hitch member 212 with spring member 218 disposed directly between one of the pivot arms and one of the tubular members and with second spring member 220 disposed directly below a respective tubular member and side bar of first member 210.

As shown in FIG. 14, spring members 218 and 220 are thus disposed in one of three positions which is the farthest perpendicular distance away from axis K. FIG. 14 also shows in phantom lines the shock absorbing mechanism mounted via holes 262A, 268A and 270A so that the spring members 218 and 220 are in a position which is a closer perpendicular distance from axis K. A shock absorbing mechanism may also be mounted in the intermediate position associated with holes 262B, 268B and 270B. Altering the position of the shock absorbing mechanism so that it is a different normal distance from axis K changes the torque requirements for compressing the spring members and thus provides an adjustment mechanism whereby hitch 200 is suited for use with towed vehicles having different weights. It is noted that each of holes 260 is larger than its counterpart hole 262 to allow for access via a socket wrench or the like to the head of bolt 280.

Rear segment 258 further defines a plurality of longitudinally spaced holes in the side walls thereof. More particularly, the exemplary embodiment shows five such holes denoted as 286A-E, each of which is a different perpendicular distance from axis K. Thus for instance, hole 286A and axis K define therebetween a perpendicular distance D4, hole 268C and axis K define therebetween a perpendicular distance D5 which is greater than D4, and hole 286E and axis K define therebetween a perpendicular distance D6 which is greater than D5. Each of holes 286B and 286D are likewise different perpendicular distances from axis K but for purposes of clarity these distances are not explicitly shown in FIG. 14. Fifth wheel 216 is mounted via the various holes 286 as further discussed below, and thus is moveable in the longitudinal direction to alternate positions which are at respective perpendicular distances from axis K which are different from one another. Thus, hitch 200 may utilize movement of the fifth wheel or movement of the spring members toward and away from axis K in order to provide alternate settings for use with towed vehicles of different weights.

Hitch member 212 further includes a pair of axially extending cross bars 288 and 290 (FIGS. 11, 13) which extend substantially parallel to one another and are longitudinally spaced from one another a relatively short distance for receiving a portion of the fifth wheel mounting structure.

Figure 12:
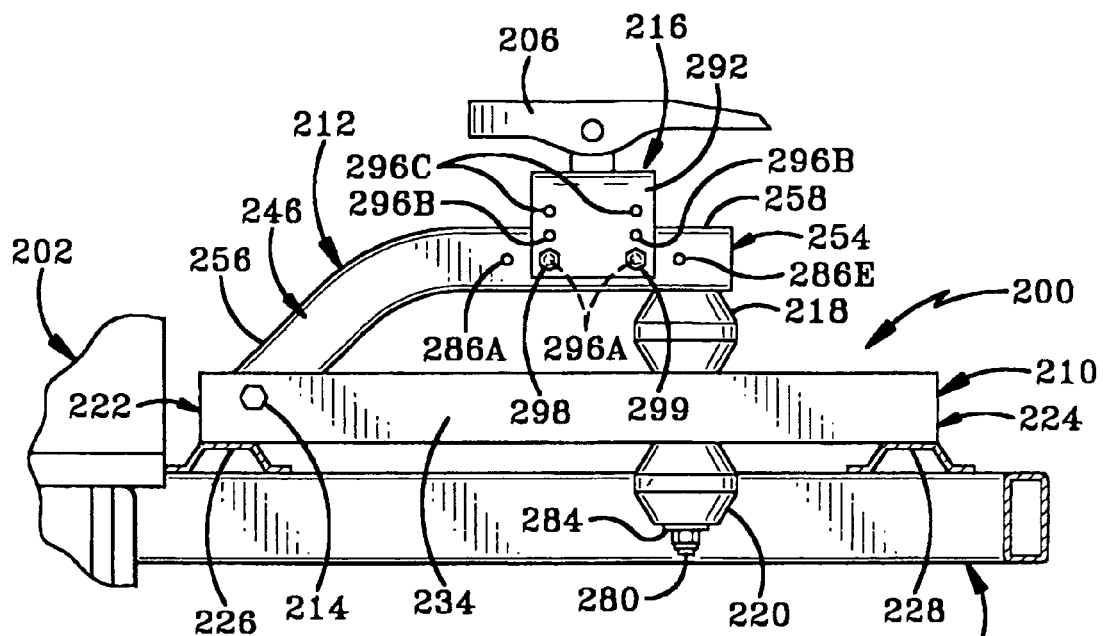
FIG. 12 is a sectional view taken on line 12-12 of FIG. 11.

Each of cross bars 288 and 290 is rigidly mounted at either end thereof to respective mounting brackets comprising inverted U-shaped flanges 292 and 294. Each flange 292 and 294 includes a pair of spaced side walls extending downwardly from an intervening top wall. Each side wall of these flanges defines respective sets of longitudinally spaced holes designated at 296A, 296B and 296C (FIG. 12). Each of the side walls of the respective brackets 292 and 294 define therebetween a space for receiving a respective rear segment 258 of pivot arms 246 and 248. One of sets 296 aligns with a respective pair of holes 286 in each rear segment 258 and respectively receive therethrough fasteners shown here in the form of bolts 298 and 300. Thus, the height adjustment mechanism 216 includes flanges 292 and 294 with the various sets 296 of holes which are alternately alignable with a respective pair of the holes 286 to set the height of the mounting location for fifth wheel 216 and thus vary the height of fifth wheel 216. Thus, the height adjustment mechanism 216 provides vertical adjustment with respect to pivot arms 246 and 248.

In addition, the longitudinal adjustment of flanges 292 and 294, cross bars 288 and 290 and fifth wheel 216 involve the sets 296 of holes, holes 286 and bolts 298 and 300. FIGS. 12 and 14 together show that bolts 298 and 300 extend respectively through set 296A of holes and holes 286B and 286D of the pivot arm. The figures thus show the mounting structure on which the fifth wheel 216 is mounted in a longitudinally intermediate position. Alternately, the mounting structure may be moved rearwardly so that bolts 298 and 300 are disposed respectively in holes 286C and 286E or longitudinally forward to a position where bolts 298 and 300 are disposed respectively in holes 286A and 286C. It is noted that the structure of cross bars 288 and 290 and flanges 292 and 294 or similar structures are commonly available and thus hitch 200 may be configured without these elements whereby the user may mount his or her own mounting structure on pivot arms 246 and 248 while providing the vertical adjustment capability as well as the longitudinal spacing of the mounting structure.

Figure 15:
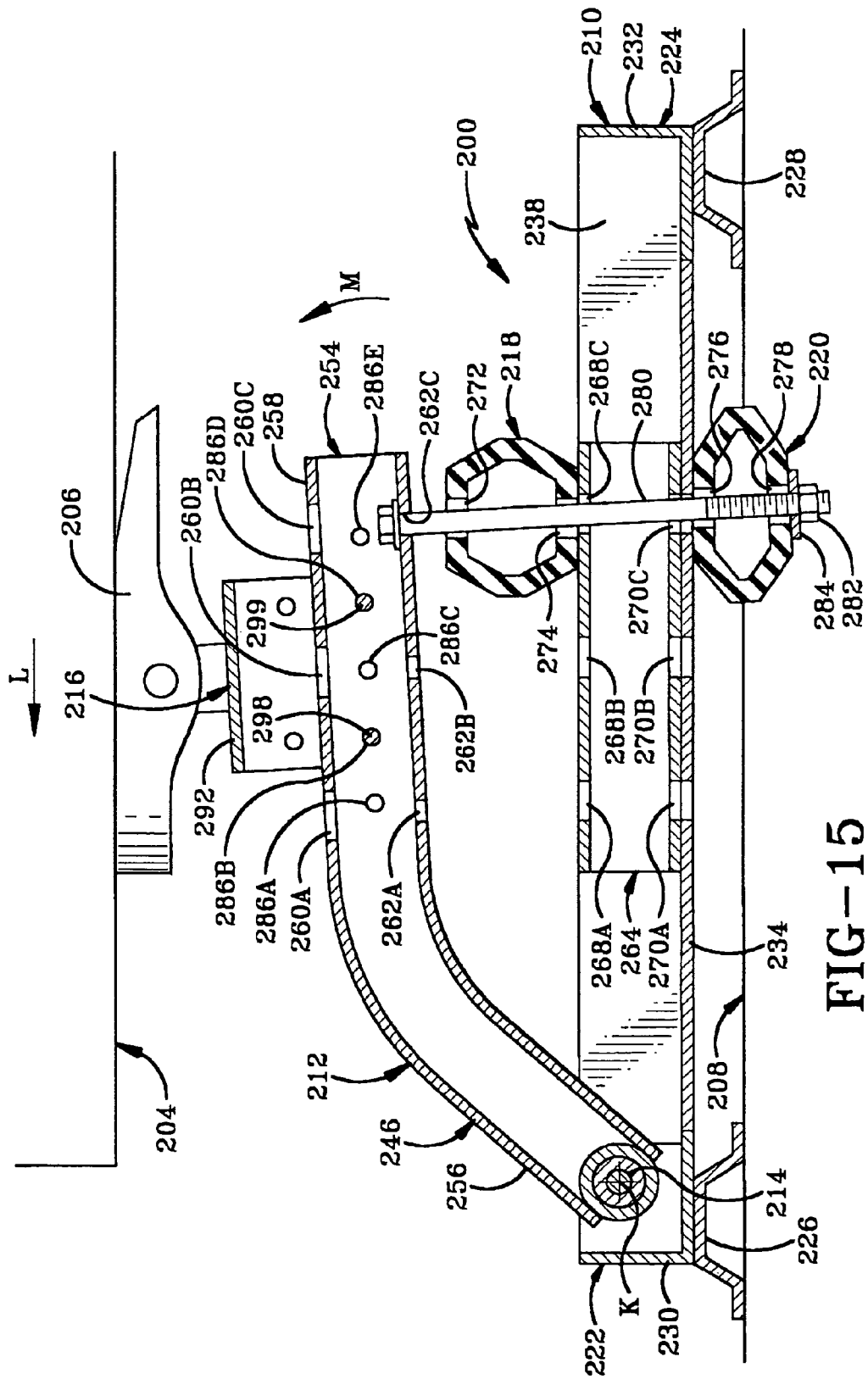
FIG. 15 is a sectional view similar to FIG. 14 showing the second embodiment in a deceleration position associated with the slowing of the towing vehicle wherein the towed vehicle is moving in a forward direction with respect to the towing vehicle.
Figure 16:
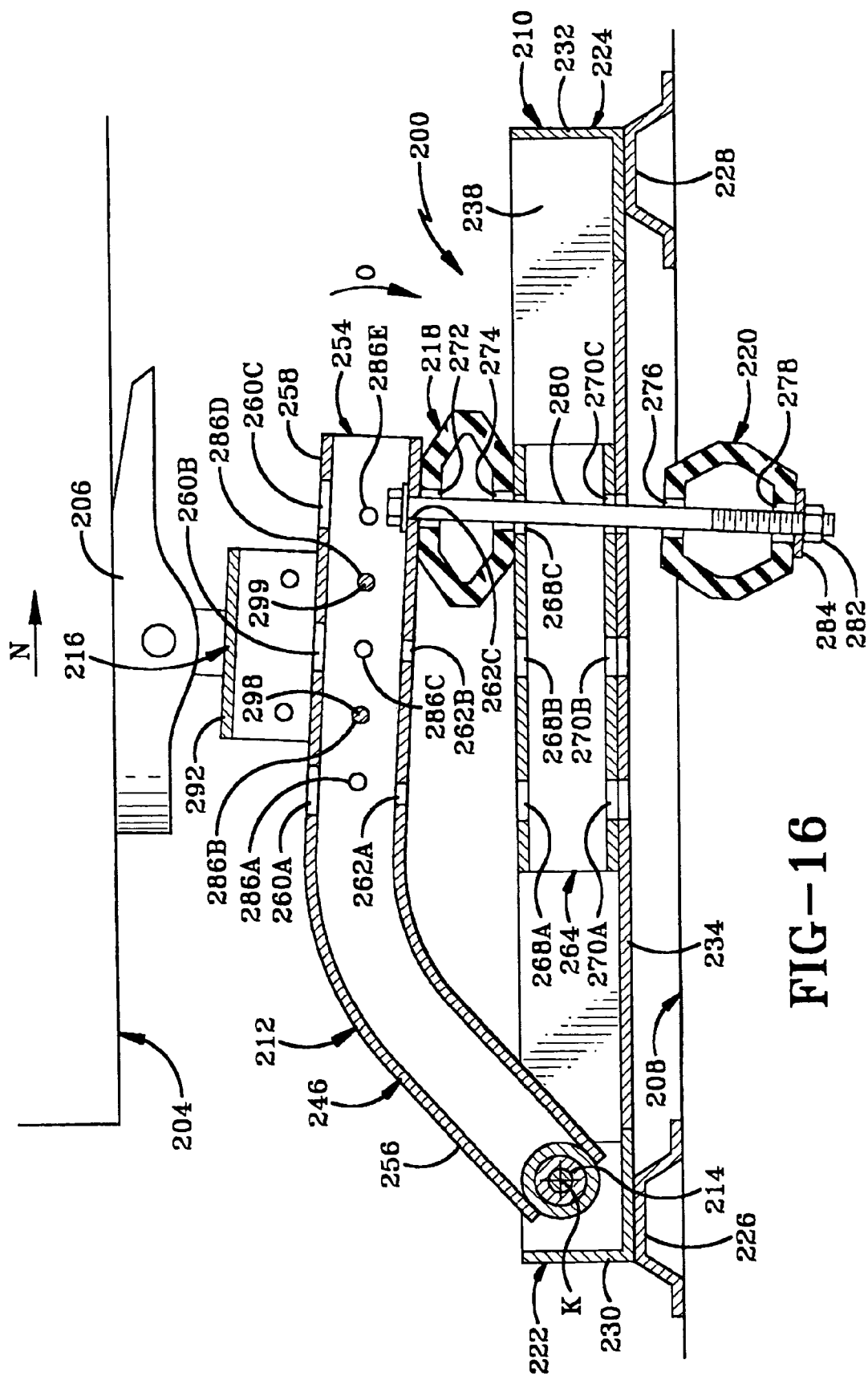
FIG. 16 is similar to FIG. 15 and shows the second embodiment in an acceleration position associated with the acceleration of the towing vehicle and showing the towed vehicle moving in a rearward direction with respect to the towing vehicle.

The operation of hitch 200 is described with reference to FIGS. 15 and 16. FIG. 15 illustrates a deceleration of the towing vehicle and towed vehicle. More particularly, FIG. 15 shows towed vehicle 204 moving forward as indicated at Arrow L as would be the case during the braking of towing vehicle 202 whereby pivot arms 246 and 248 pivot about axis K in a first direction as indicated by Arrow M so that the rear ends 254 of the pivot arms move upwardly. This movement is translated via bolt 280 and retaining plate 284 to first spring member 220, which is compressed by the force between retaining plate 284 and the downwardly facing lower surface of a respective one of side bars 234 and 236 to react the pivotal movement and absorb or dampen the upward rotational force. FIG. 16 shows the opposite situation which occurs during acceleration of the towing vehicle so that towed vehicle 204 moves relatively rearward or applies a rearward force as indicated at Arrow N which causes the downward pivotal movement of pivot arms 246 and 248 about axis K as indicated at Arrow 0. This downward pivotal movement is reacted by first spring member 218 via the compression thereof between the respective pivot arm and respective tubular member 264 of first member 210. In addition, FIG. 16 shows the primary motion which will be dampened or absorbed during ordinary travel due to the fact that the towed vehicle 204 will tend to compress the first ring members 218 to some degree due to their weight even in a resting position. The spring members of course dampen the relative movement between the towing and towed vehicles caused by bumps and dips in the road and so forth.

Figure 16B:
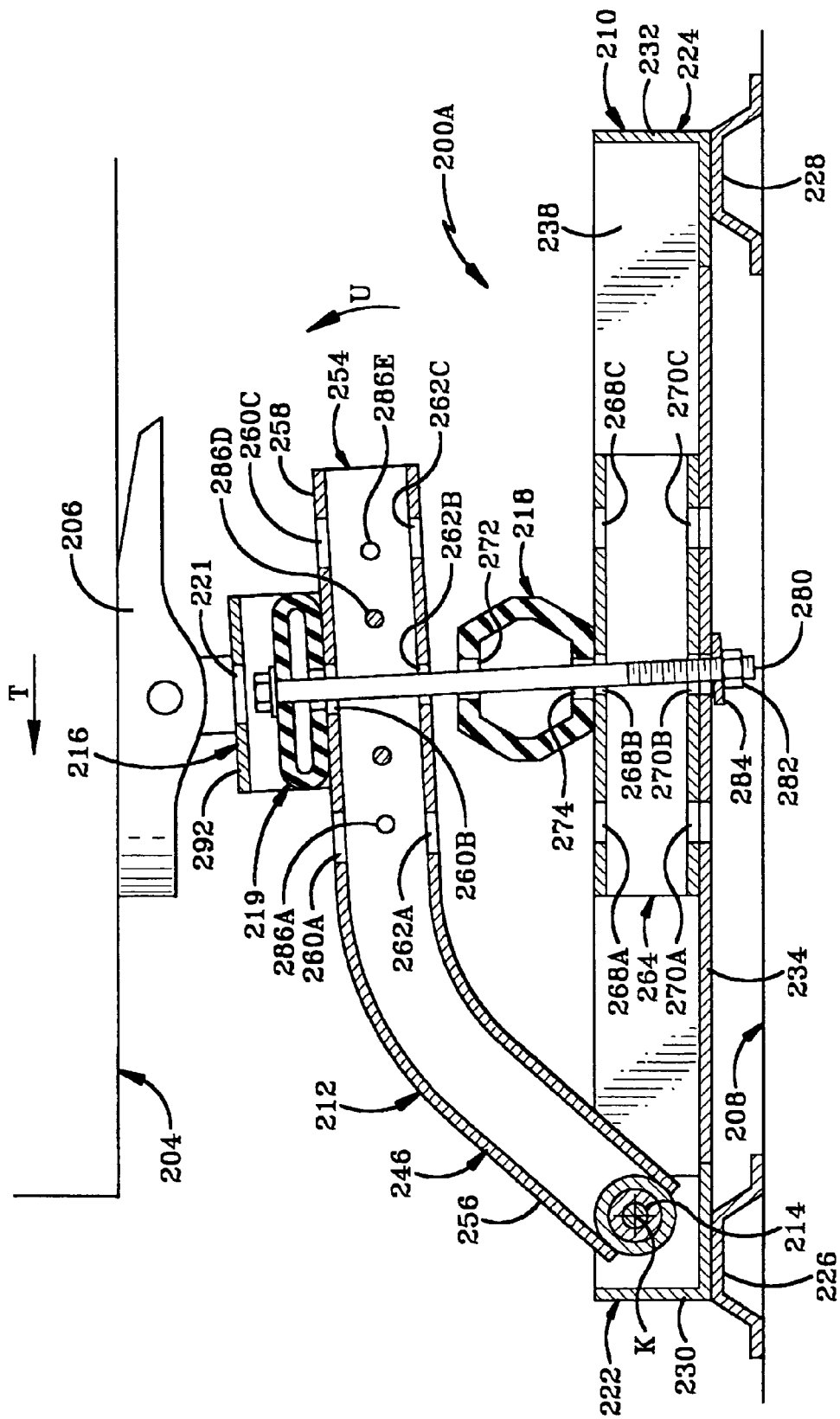
FIG. 16B is similar to FIG. 15 and shows the variation of the second embodiment in a deceleration position.
Figure 16C:
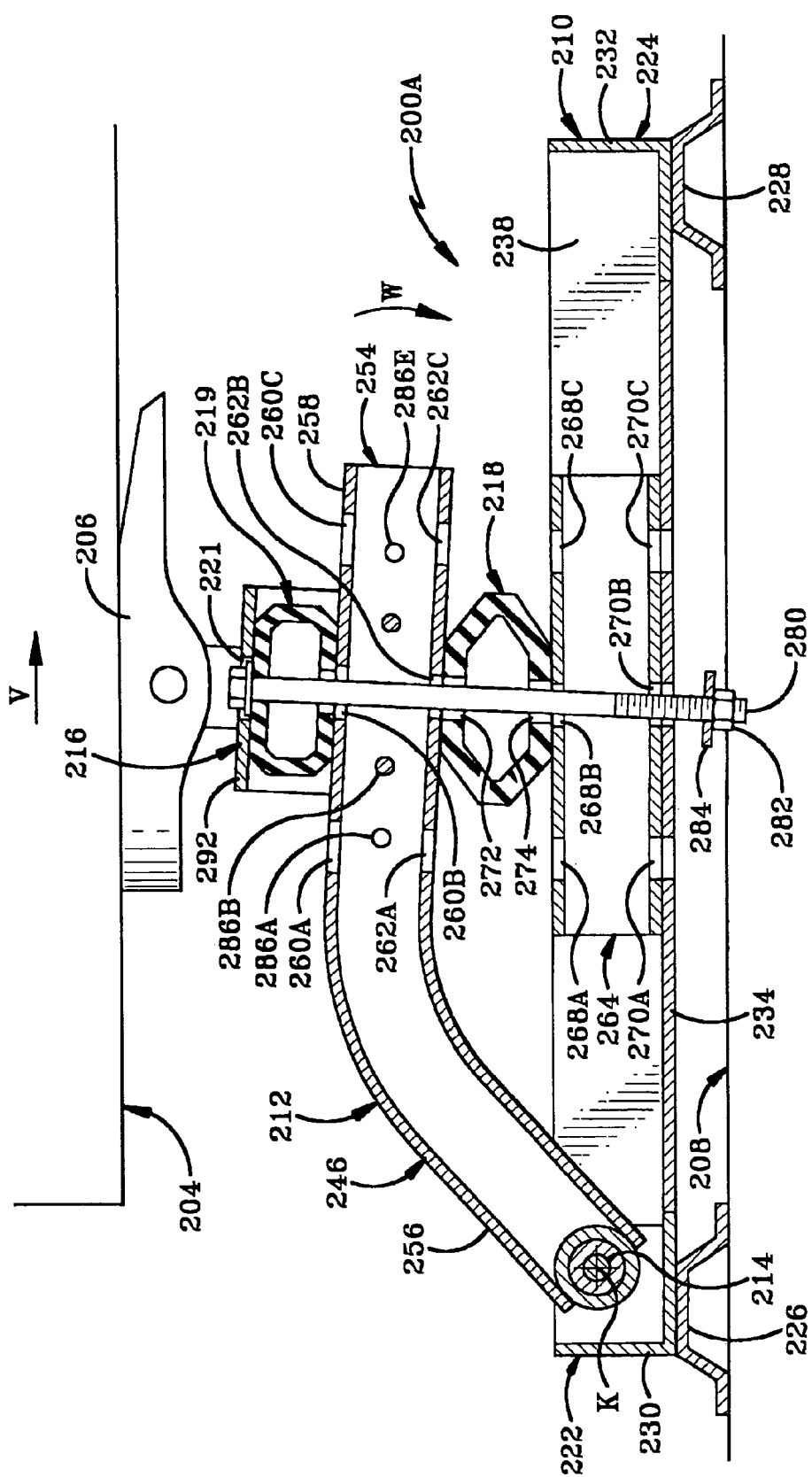
FIG. 16C is similar to FIG. 16 and shows the variation of the second embodiment in an acceleration position.

FIGS. 16A-C show a variation of hitch 200 which is indicated generally at 200A. The primary distinction between hitch 200A and 200 is related to the shock absorbing mechanism. The shock absorbing mechanism of hitch 200A illustrates one of a variety of alternate locations for the spring members. The shock absorbing mechanism of hitch 200A retains first spring member 218 and includes a second spring member 219 having an altered configuration in order to fit atop pivot arm 246 in the space bounded by the upper surface thereof and the walls of bracket 292 of vertical adjustment mechanism 216. The top wall of bracket 292 defines a hole 221 for receiving the head of bolt 280 and the washer disposed adjacent the head of bolt 280. FIG. 16A also illustrates the shock absorbing mechanism in an intermediate position with bolt 280 extending through holes 260B, 262B, 268B and 270B. The positioning of second spring member 219 above arm 246 instead of below first member 210 allows for the usage of hitch 200A where there is not sufficient space to position a spring member between the lower surface of first member 210 and the upper surface of frame 208 of the towing vehicle.

FIG. 16B illustrates the deceleration of the towing vehicle so that towed vehicle 204 is moving forward relative to the towed vehicle as indicated at Arrow T so that hitch member 212 rotates upwardly as indicated at Arrow U, thereby compressing second spring member 219 to react the movement and absorb the shock thereof. FIG. 16C shows the acceleration position of the towing vehicle so that the towed vehicle 204 is moving relatively rearwardly as indicated at Arrow V so that hitch member 212 rotates downwardly as indicated at Arrow W to compress first spring member 218.

The configuration of the shock absorbing mechanism of hitch 200A is but one variation. Alternately, a spring member may be disposed atop bracket 292, especially if bracket 292 is disposed in a lower position than shown in the figures. In addition, a spring member may be disposed within the tubular pivot arm 246 or within tubular member 264 of first member 210.

Thus, hitches 200 and 200A provide simple and cost effective shock absorbing hitches which in the preferred embodiment utilizes non-pressured spring members and more preferably hollow elastomeric cushions. This configuration eliminates the need for the various structures associated with pneumatic shock absorbers as discussed in the Background section of the present application. Thus, in the preferred embodiment of the present invention, hitch 200 is free of all such apparatus associated with the pneumatic system, thus eliminating the need for separate compressors or the conduits and valves and various connectors associated therewith.

Hitch 300 is now described with reference to FIGS. 17-20. Hitch 300 is similar to hitch 200 except that the shock absorbing mechanism has a different configuration and hitch 300 does not provide a vertical adjustment mechanism for the coupler nor longitudinal adjustment mechanisms for the coupler or the spring members. Hitch 300 includes a first member 302 and a hitch member 304 which are respectively similar to first member 210 and hitch member 212 of hitch 200 and are thus pivotally mounted about a single axis in the same manner. Only the main distinctions between the two embodiments will be discussed herein.

Hitch member 304 includes a cross bar 306 similar to cross bar 250. Cross bar 306 is configured for mounting thereon the spring members of the shock absorbing mechanism of hitch 300. More particularly, cross bar 306 is in the form of a channel member having a U-shaped cross section formed by first and second spaced legs 308 and 310 which extend upwardly from an intervening base 312. Base 312 is generally flat and angled with respect to a horizontal plane. Base 312 defines a pair of axially spaced holes 314 (only one shown in FIG. 20).

First member 302 includes a mounting structure 316 (FIGS. 19-20) in the form of an angle iron having first and second legs 318 and 320 extending substantially perpendicular to one another. Mounting structure 316 extends axially between and is rigidly connected to each of intermediate members 238 and 240, typically by welding. More particularly, structure 316 is mounted with the respective free ends of legs 318 and 320 in contact with each of members 238 and 240 so that first leg 318 is angled with respect to a horizontal plane and is substantially parallel to base 312 of cross bar 306. First leg 308 defines a pair of axially spaced holes 322 (only one shown in FIG. 20) which are respectively aligned with holes 314 of base 312.

The shock absorbing mechanism of hitch 300 includes upper and lower first spring members 324 and 326 which are disposed directly between base 312 and the first leg 318 and are in abutment with one another and respectively with base 312 and first leg 318. Similar to hitch 200, spring members 324 and 326 are in the form of hollow elastomeric springs although the specific springs of hitch 300 are axially elongated as opposed to spring members 218 of hitch 200 which are substantially circular in cross section. Upper spring member 324 defines a pair of axially spaced upper holes 328 (one shown) and a pair of axially spaced lower holes 330 (one shown) which communicate with its interior chamber and lower spring member 326 likewise defines a pair of upper holes 332 (one shown) and a pair of lower holes 334 (one shown) which communicate with its interior chamber. Holes 328-334 are aligned with one another and with holes 314 and 322. The shock absorbing mechanism further includes a pair of axially spaced second spring members 336 (FIG. 17) each of which defines a pair of holes 338 and 340 which are in communication with its interior chamber and are aligned with one another and holes 314, 322 and 328-334. A fastener including a bolt 342 and a nut 344 which threadably engages bolt 342 connects spring members 324, 326 and 336 to base 312 and first plate 318. More particularly, the shaft of bolt 342 extend through the aligned holes 314, 322, 328-334, 338 and 340. Nut 344 is disposed below first leg 318 and the head of bolt 342 is disposed above second spring member 336 with retaining plate 346 disposed between the head of bolt 342 and the upper wall of spring member 336. Bolt 342 thus extends upwardly on an angle and is substantially perpendicular to base 312 and leg 318 in contrast with bolt 280 of hitch 200 which is disposed substantially vertically.

Hitch member 304 includes first and second spaced pivot arms 348 and 350 which are similar to pivot arms 246 and 248 of hitch 200 except that they do not define the various holes which provide for the vertical and longitudinal adjustment of cross bars 288 and 290 and the longitudinal positioning of spring members 218 and 220. Hitch member 304 further includes a pair of cross bars 352 and 354 which are longitudinally spaced and substantially parallel to one another. Cross bars 352 and 354 extend between and are rigidly connected to pivot arms 348 and 350, typically by welding. Cross bars 352 and 354 provide the mounting location for fifth wheel 206, which may be fixedly or removably mounted on cross bars 352 and 354.

Figure 21:
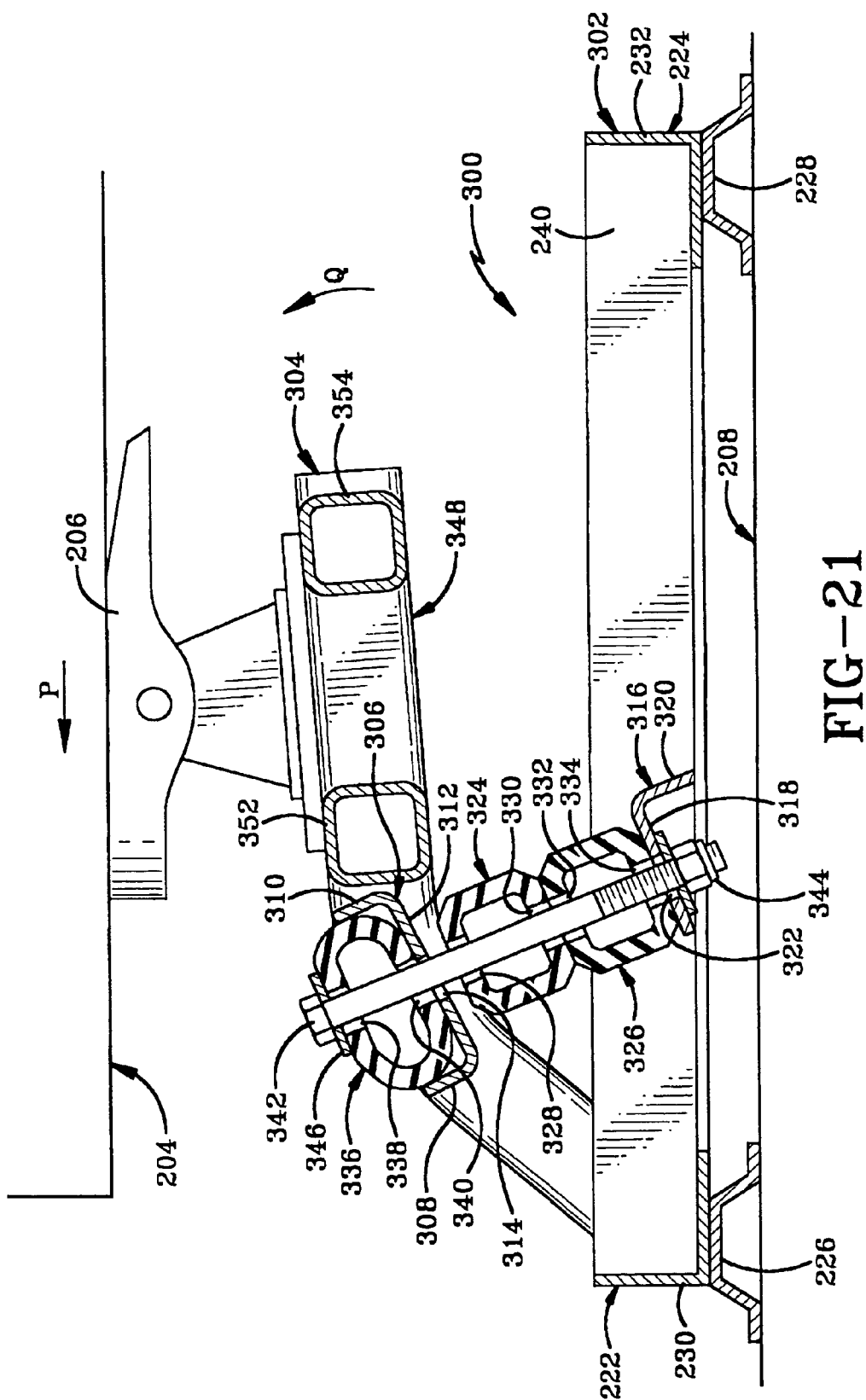
FIG. 21 is similar to FIG. 20 and shows the third embodiment in a deceleration position similar to that shown in FIG. 15 with regard to the second embodiment.
Figure 22:
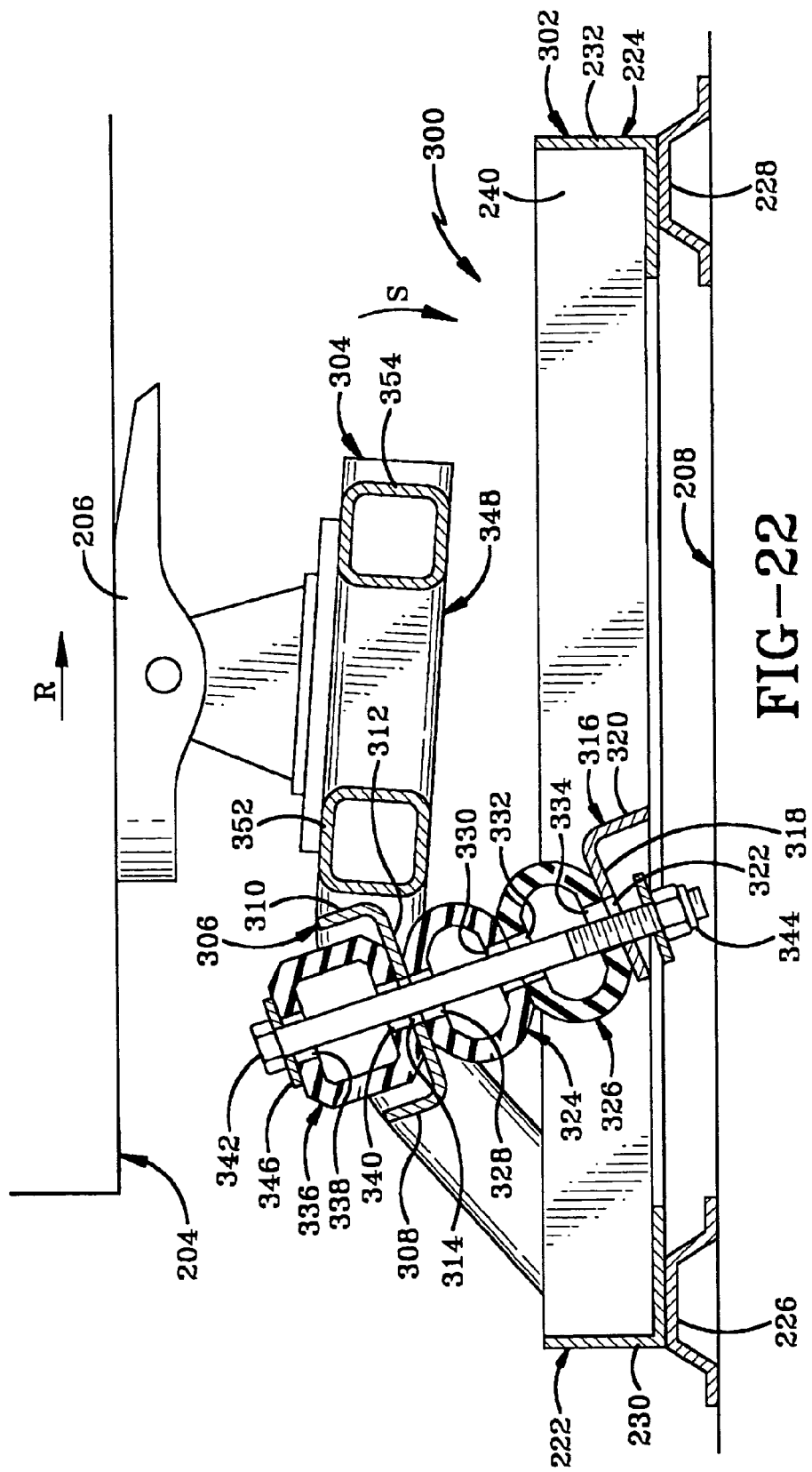
FIG. 22 is similar to FIG. 21 and shows the third embodiment in an acceleration position similar to that shown in FIG. 16 with regard to the second embodiment.

With reference to FIGS. 21-22 the operation of hitch 300 is described. Hitch 300 operates in a manner similar to hitch 200. Thus, as shown in FIG. 21, during deceleration of the towing vehicle and relative forward movement of the towed vehicle is indicated at Arrow P, first member 304 pivots upwardly (Arrow Q) to compress second spring member 336 between base 312 and retaining plate 346 in order to react and dampen the pivotal movement. As shown in FIG. 22, during acceleration of the towing vehicle so that the towed vehicle moves rearwardly relative thereto as indicated by Arrow R, hitch member 304 pivots downwardly as indicated at Arrow S so that first spring members 324 and 326 are compressed between base 312 and first leg 318 to react and dampen the downward pivotal movement. In addition, the spring members will serve to absorb the various vertically oriented forces experienced between the towing vehicle and the towed vehicle whether the towing vehicle and towed vehicle are moving at constant speeds, accelerating or decelerating.

Hitch 400 (FIG. 23) is similar to hitch 300 except that it is configured for use with an alternate coupler in lieu of a fifth wheel. Hitch 400 simply shows one configuration by which the shock absorbing hitch of the present invention may be used with a trailer having a goose neck configuration. More particularly, hitch 400 includes a cross bar 400 which extends between and is rigidly connected to each of spaced pivot arms 348 and 350. Cross bar 402 includes first and second angled segments 404 and 406 and a central segment 408. More particularly, angle segments 404 and 406 angle axially downwardly toward one another to connect to central segment 408 which extends substantially horizontally in the axial direction. A coupler in the form of a hitch ball 410 is mounted on a threaded shaft 412 which extends through a hole or holes formed in central segment 408 and threadedly engages a nut 414 to secure hitch ball 410 on segment 408. The configuration of hitch 400 thus positions hitch ball 410 at a location which is suitable for connection with a goose neck hitch.

Various aspects of the different embodiments may be combined as will be evident to one skilled in the art. For example, the goose neck configuration shown in hitch 400 may be adapted with the vertical and horizontal aspects of hitch 200. In addition, the number of spring members may vary in accordance with the circumstances and may be positioned in various locations. In addition, while it is convenient for the first and second spring members of the various embodiments to be aligned with one another and mounted via a single fastener to the first member and hitch member, this may vary. For example, the first spring members may be mounted in a similar fashion with a single fastener without fastening the second spring member via that same fastener. Thus, the second spring member may for instance be positioned centrally as generally disclosed regarding hitch 300 while the first spring members may be spaced and disposed laterally as shown in hitch 200. In addition, an alternate stop configuration may be used to limit rotation of the hitch member which does not utilize the second spring members as described herein and such a stop may be located in various locations. In the exemplary embodiments, the bolts which extend through the first member, the first spring members and the hitch member serve in part to provide such a stop. However, where the stop is provided elsewhere the first spring members may be mounted on one of the first member and the hitch member with the bolt extending through only one of these first and hitch members and may be otherwise mounted without the use of a bolt or similar fastener. However, the exemplary embodiments provide a simple and cost effective configuration for providing the shock absorbing aspect of the present invention. Other changes within the scope of the invention will be evident to one skilled in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A shock-absorbing receiver hitch for use between a towing vehicle and a towed vehicle wherein a receiver having a receiving member defining an interior chamber is mounted on the towing vehicle, the hitch comprising:
   a first member adapted to be received within the interior chamber of the receiving member to mount the first member on the towing vehicle;
   a hitch member which is adapted to engage the towed vehicle and which is pivotally mounted on the first member; and
   a shock absorbing mechanism comprising a housing rigidly mounted on the first member and at least one spring member disposed therein for reacting pivotal movement of the hitch member.

2. The hitch of claim 1 wherein the hitch member includes a first leg which extends downwardly from adjacent the first member, a second leg which extends rearwardly from the first leg and a coupler mounted on the second leg and adapted to couple with a coupler of the towed vehicle.

3. The hitch of claim 2 wherein the coupler includes a hitch ball which is spaced rearwardly from and extends upwardly from the second leg so that the first leg, the hitch ball and a portion of the second leg extending therebetween form a generally U-shaped configuration.

4. The hitch of claim 1 wherein the hitch member is pivotally mounted on the first member about a single axis.

5. The hitch of claim 4 wherein the hitch member includes a pair of spaced walls which receive therebetween a portion of the first member; and wherein the pivot axis passes through the spaced walls and the portion of the first member.

6. The hitch of claim 1 wherein the first member has a substantially square cross sectional shape adapted to fit within a mating cross sectional shape of the interior chamber of the receiving member.

7. The hitch of claim 1 wherein the first member and a portion of the shock absorbing mechanism define therebetween a space adapted to receive therein a portion of the receiving member.

8. The hitch of claim 1 wherein the shock absorbing mechanism is disposed below the first member; and wherein the hitch member extends downwardly from the first member rearwardly of the shock absorbing mechanism.

9. The hitch of claim 8 further including a push rod extending between and connected to the hitch member and the shock absorbing mechanism.

10. The hitch of claim 1 wherein the shock absorbing mechanism includes a housing and at least one spring member disposed therein.

11. The hitch of claim 10 wherein the housing defines an entrance opening; and further including a push rod which is connected to the hitch member, extends from the hitch member through the entrance opening, and is connected to the at least one spring member within the housing whereby the at least one spring member reacts the movement of the hitch member via the push rod.

12. A shock-absorbing receiver hitch for use between a towing vehicle and a towed vehicle wherein a receiver having a receiving member defining an interior chamber is mounted on the towing vehicle, the hitch comprising:
   a first member adapted to be received within the interior chamber of the receiving member to mount the first member on the towing vehicle;
   a hitch member which is adapted to engage the towed vehicle and which is pivotally mounted on the first member;
   a shock absorbing mechanism comprising a housing and at least one spring member disposed therein for reacting pivotal movement of the hitch member;
   wherein the housing defines an entrance opening; and further including a push rod which is connected to the hitch member, extends from the hitch member through the entrance opening, and is connected to the at least one spring member within the housing whereby the at least one spring member reacts the movement of the hitch member via the push rod;
   wherein the at least one spring member includes first and second spring members; further including a movable wall mounted on the push rod between the first and second spring members; and wherein the movement of the hitch member is translated to the spring members via the push rod and the movable wall.

13. The hitch of claim 12 wherein the housing is rigidly mounted on the first member.

14. The hitch of claim 1 wherein the first member has front and rear opposed ends; wherein the housing is mounted on the first member adjacent the rear end thereof.

15. The hitch of claim 14 wherein the housing extends forward in a cantilever fashion from adjacent the rear end of the first member.

16. The hitch of claim 15 wherein the housing includes a portion forward of the rear end of the first member; and wherein the portion of the housing and the first member define therebetween a space adapted to receive a portion of the receiving member.

17. The hitch of claim 1 further including a push rod connected to the hitch member for translating movement of the hitch member to the shock absorbing mechanism; and wherein the push rod is spaced from the first member so that the first member, the push rod and a portion of the hitch member extending therebetween form a generally U-shaped configuration.

18. The hitch of claim 1 wherein the hitch member includes a hitch ball adapted to fit within a socket of the towed vehicle.

19. The hitch of claim 18 further including a height adjustment mechanism for securing the hitch ball at different heights.

20. The hitch of claim 1 wherein the first member defines a pivot hole; wherein the hitch member defines a pivot hole aligned with the first member pivot hole; and wherein a pivot extends through the pivot holes to pivotally mount the hitch member on the first member.

21. A shock-absorbing receiver hitch for use between a towing vehicle and a towed vehicle wherein a receiver having a receiving member defining an interior chamber is mounted on the towing vehicle, the hitch comprising:
   a first member adapted to be received within the interior chamber of the receiving member to mount the first member on the towing vehicle;

a hitch member which is adapted to engage the towed vehicle and which is pivotally mounted on the first member;

a shock absorbing mechanism for reacting pivotal movement of the hitch member and having front and rear ends; and a portion of the shock absorbing mechanism and the first member defining therebetween a receiving space which extends rearwardly of the front end of the shock absorbing mechanism and receives therein a portion of the receiving member when the first member is received within the interior chamber of the receiving member.

22. The hitch of claim 21 wherein the shock absorbing mechanism comprises a housing and a first spring member disposed therein; and further comprising front and rear ends on the first member; front and rear ends on the housing; and wherein the front end of the housing is adjacent the front end of the first member; and the first spring member is disposed entirely forward of the rear end of the first member.

23. The hitch of claim 22 further comprising a second spring member which is disposed within the housing rearward the first spring member and which is entirely forward of the rear end of the first member.

24. The hitch of claim 23 further comprising a first wall on the housing which is forward of the first spring member and against which the first spring member is compressed in response to pivotal movement of the hitch member in a first direction; and a second wall on the housing which is rearward of the second spring member and against which the second spring member is compressed in response to pivotal movement of the hitch member in a second direction opposite the first direction; and wherein the first and second walls are entirely forward of the rear end of the first member.

* * * * *